(12) United States Patent
Padaki et al.

(10) Patent No.: US 11,343,646 B2
(45) Date of Patent: May 24, 2022

(54) METHOD AND APPARATUS FOR LOCALIZATION

(71) Applicant: Samsung Electronics Co., Ltd., Suwon-si (KR)

(72) Inventors: Aditya V. Padaki, Richardson, TX (US); Boon Loong Ng, Plano, TX (US); Chiranjib Saha, Blacksburg, VA (US); Raghunandan M. Rao, Blacksburg, VA (US); Yi Yang, Suwon-si (KR); Moonseok Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/998,929

(22) Filed: Aug. 20, 2020

(65) Prior Publication Data
US 2021/0058744 A1    Feb. 25, 2021

Related U.S. Application Data

(60) Provisional application No. 62/890,889, filed on Aug. 23, 2019, provisional application No. 62/890,908, (Continued)

(51) Int. Cl.
*H04W 4/029* (2018.01)
*G01S 13/76* (2006.01)

(52) U.S. Cl.
CPC .......... *H04W 4/029* (2018.02); *G01S 13/767* (2013.01)

(58) Field of Classification Search
CPC .............................. H04W 4/029; A61B 5/061
(Continued)

(56) References Cited

U.S. PATENT DOCUMENTS 10,240,930 B2    3/2019 Zhou et al.
10,433,111 B2   10/2019 Prevatt et al.
(Continued)

FOREIGN PATENT DOCUMENTS

CN           104854428 B     12/2018
CN           106950528 B     12/2019
KR    10-2012-0016237 A       2/2012

OTHER PUBLICATIONS

Zhang, et al., "AOA-Based Three-Dimensional Multi-Target Localization in Industrial WSNs for LOS Conditions," Sensors 2018, 18, 2727, Aug. 19, 2018, 19 pages.
(Continued)

*Primary Examiner* — Kiet M Doan

(57) ABSTRACT

An electronic device and a method of the electronic device for performing localization in a wireless communication system are provided. The electronic device and method comprise: receiving, from a plurality of anchor nodes, signals for the localization; performing ranging measurements of the signals based on a range and an angle of arrival (AoA) of the signals; determining whether at least one of the plurality of anchor nodes is not detected based on the ranging measurements; determining, based on a determination that the at least one anchor node is not detected based on the ranging measurements, whether at least one other anchor node in the plurality of anchor nodes is located on a line of sight (LOS) from the electronic device, wherein the LOS is determined based on the AoA of the signals; and performing the localization based on the at least one other anchor node.

20 Claims, 33 Drawing Sheets

Related U.S. Application Data filed on Aug. 23, 2019, provisional application No. 62/890,928, filed on Aug. 23, 2019, provisional application No. 62/890,946, filed on Aug. 23, 2019.

(58) Field of Classification Search
USPC .................. 455/456.1, 424; 342/458, 109
See application file for complete search history.

(56) References Cited

U.S. PATENT DOCUMENTS

| | | |
|---|---|---|
| 10,459,065 B2 | 10/2019 | Georgiou et al. |
| 2012/0162012 A1 | 6/2012 | Marzouki et al. |
| 2017/0356979 A1* | 12/2017 | Georgiou .............. G01S 5/0215 |
| 2018/0199172 A1 | 7/2018 | Boily et al. |
| 2018/0317305 A1* | 11/2018 | Krajnc .................... G08B 5/00 |
| 2019/0037351 A1 | 1/2019 | Prevatt |
| 2019/0069263 A1* | 2/2019 | Ylamurto ............ H04W 64/003 |
| 2019/0223140 A1 | 7/2019 | Grossmann et al. |
| 2020/0209341 A1* | 7/2020 | Ylamurto ................ H04W 4/33 |
| 2020/0228924 A1* | 7/2020 | Lelkens .................. G01S 5/021 |

OTHER PUBLICATIONS

International Search Report of the International Searching Authority dated Dec. 9, 2020 in connection with International Application No. PCT/KR2020/011249, 4 pages.

Tseng, et al., "Wireless Location Tracking Algorithms for Environments with Insufficient Signal Sources", IEEE Transactions on Mobile Computing, vol. 8, No. 12, Dec. 2009, 14 pages.

Hoang, et al., "Mitigating Unbalanced GDoP Effects in Range-Based Vehicular Cooperative Localization", IEEE International Conference on Communications Workshops (ICC Workshops), May 21-25, 2017, 6 pages.

\* cited by examiner

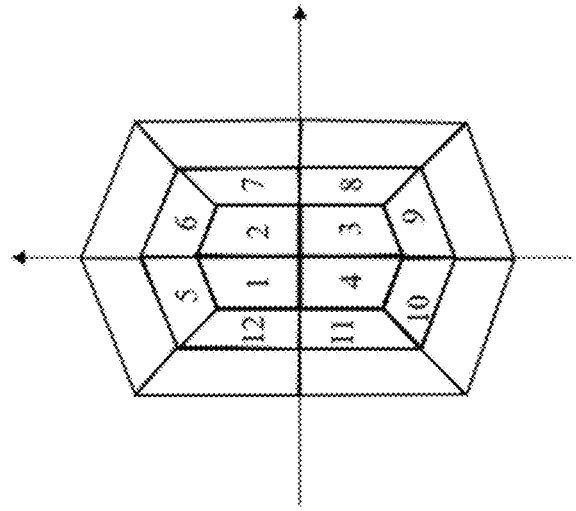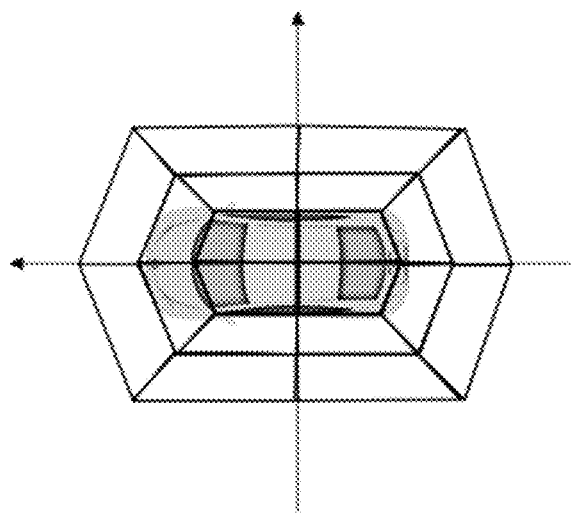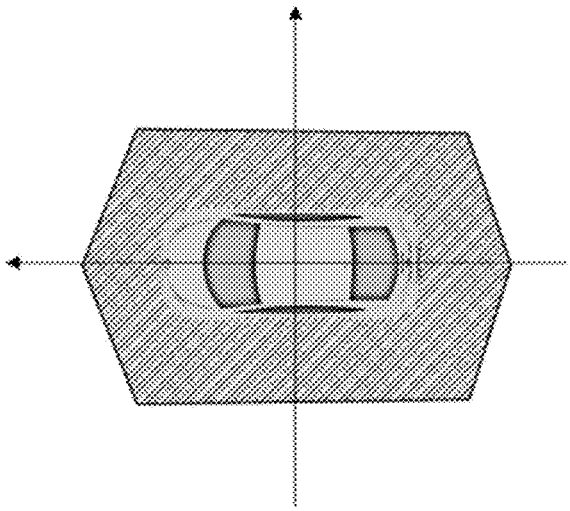
FIG. 13

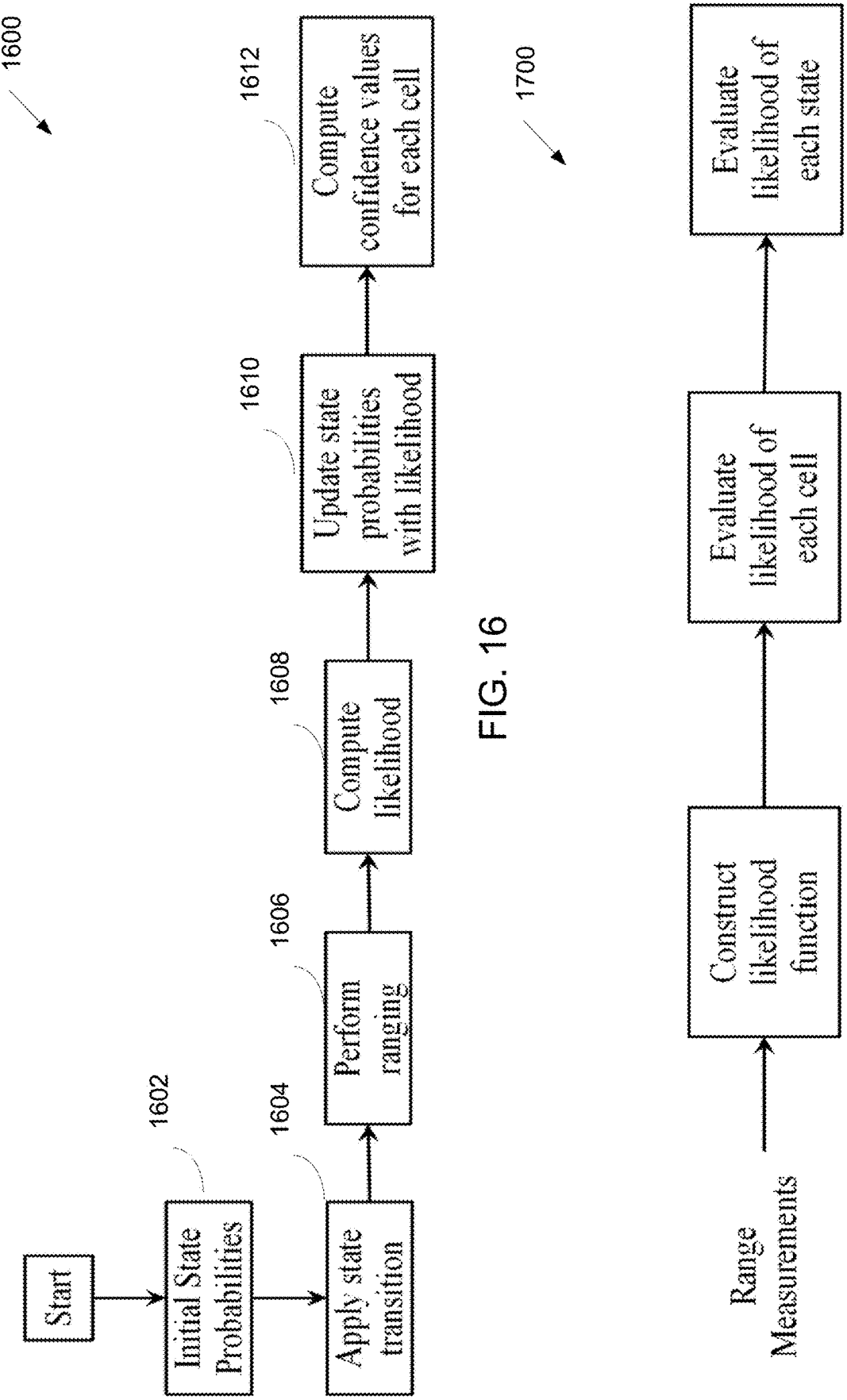

METHOD AND APPARATUS FOR LOCALIZATION

CROSS-REFERENCE TO RELATED APPLICATIONS AND CLAIM OF PRIORITY

The present application claims priority to:
U.S. Provisional Patent Application No. 62/890,889 filed on Aug. 23, 2019;
U.S. Provisional Patent Application No. 62/890,908 filed on Aug. 23, 2019;
U.S. Provisional Patent Application No. 62/890,928 filed on Aug. 23, 2019; and
U.S. Provisional Patent Application No. 62/890,946 filed on Aug. 23, 2019.
The content of the above-identified patent documents is incorporated herein by reference.

TECHNICAL FIELD

The present disclosure relates generally to localization in a wireless communication system. In particular, method and apparatus of cell-based localization in a wireless communication system are presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide method and apparatus of cell-based localization in a wireless communication network.

In one embodiment, an electronic device for performing localization in a wireless communication system is provided. The electronic device comprises a transceiver configured to receive, from a plurality of anchor nodes, signals for the localization. The electronic device further comprises a processor operably connected to the transceiver, the processor configured to: perform ranging measurements of the signals based on a range and an angle of arrival (AoA) of the signals; determine whether at least one of the plurality of anchor nodes is not detected based on the ranging measurements; determine, based on a determination that the at least one anchor node is not detected based on the ranging measurements, whether at least one other anchor node in the plurality of anchor nodes is located on a line of sight (LOS) from the electronic device, wherein the LOS is determined based on the AoA of the signals; and perform the localization based on the at least one other anchor node.

In another embodiment, a method of an electronic device for performing localization in a wireless communication system is provided. The method comprises: receiving, from a plurality of anchor nodes, signals for the localization; performing ranging measurements of the signals based on a range and an angle of arrival (AoA) of the signals; determining whether at least one of the plurality of anchor nodes is not detected based on the ranging measurements; determining, based on a determination that the at least one anchor node is not detected based on the ranging measurements, whether at least one other anchor node in the plurality of anchor nodes is located on a line of sight (LOS) from the electronic device, wherein the LOS is determined based on the AoA of the signals; and performing the localization based on the at least one other anchor node.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example constructing connectivity graph from the grid world for a 2D scenario for car access according to embodiments of the present disclosure;

FIG. 16 illustrates an example localization engine according to embodiments of the present disclosure;

FIG. 17 illustrates an example computation of the state likelihoods according to embodiments of the present disclosure;

DETAILED DESCRIPTION

FIG. 1 through FIG. 42, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
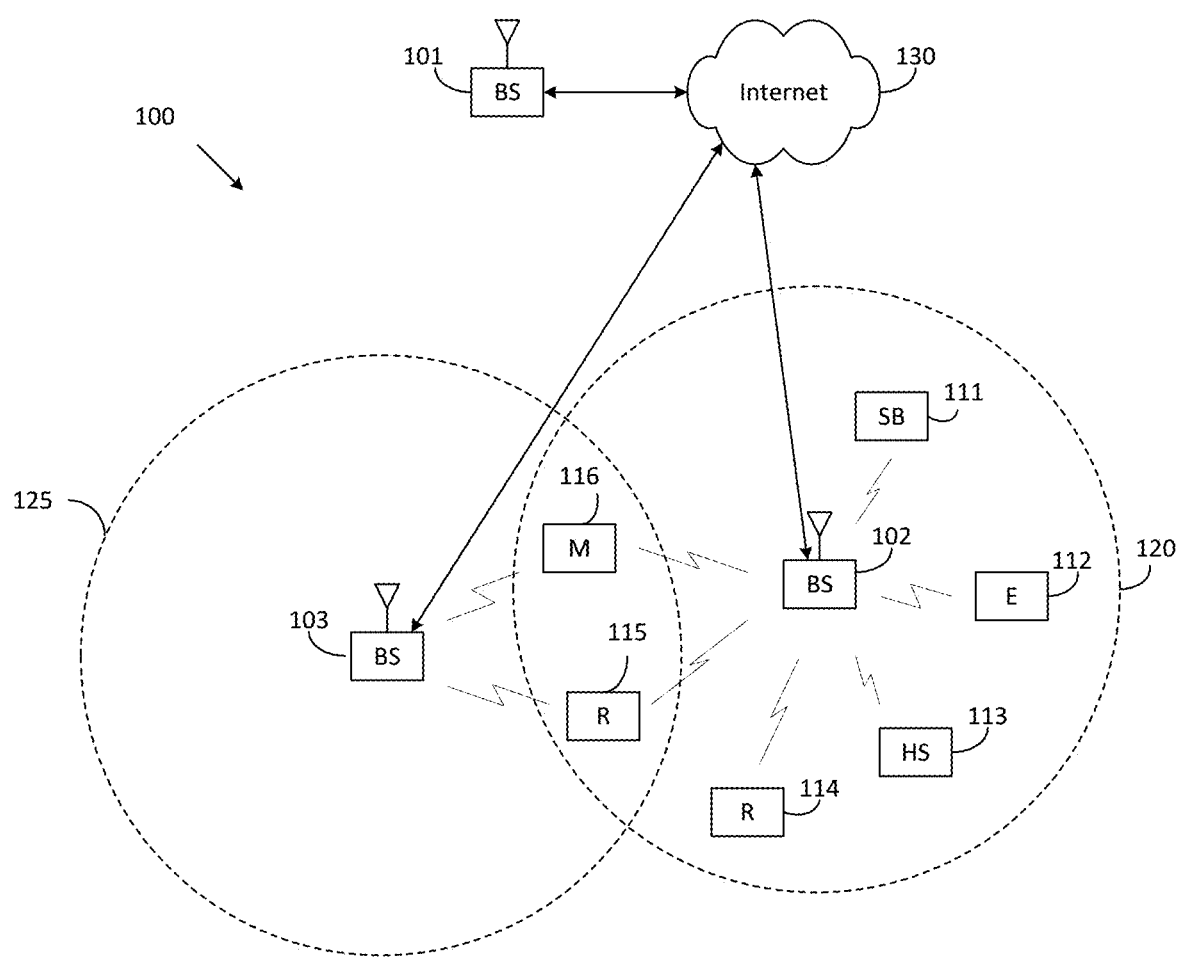
FIG. 1 illustrates an example wireless network according to embodiments of the present disclosure.
Figure 2:
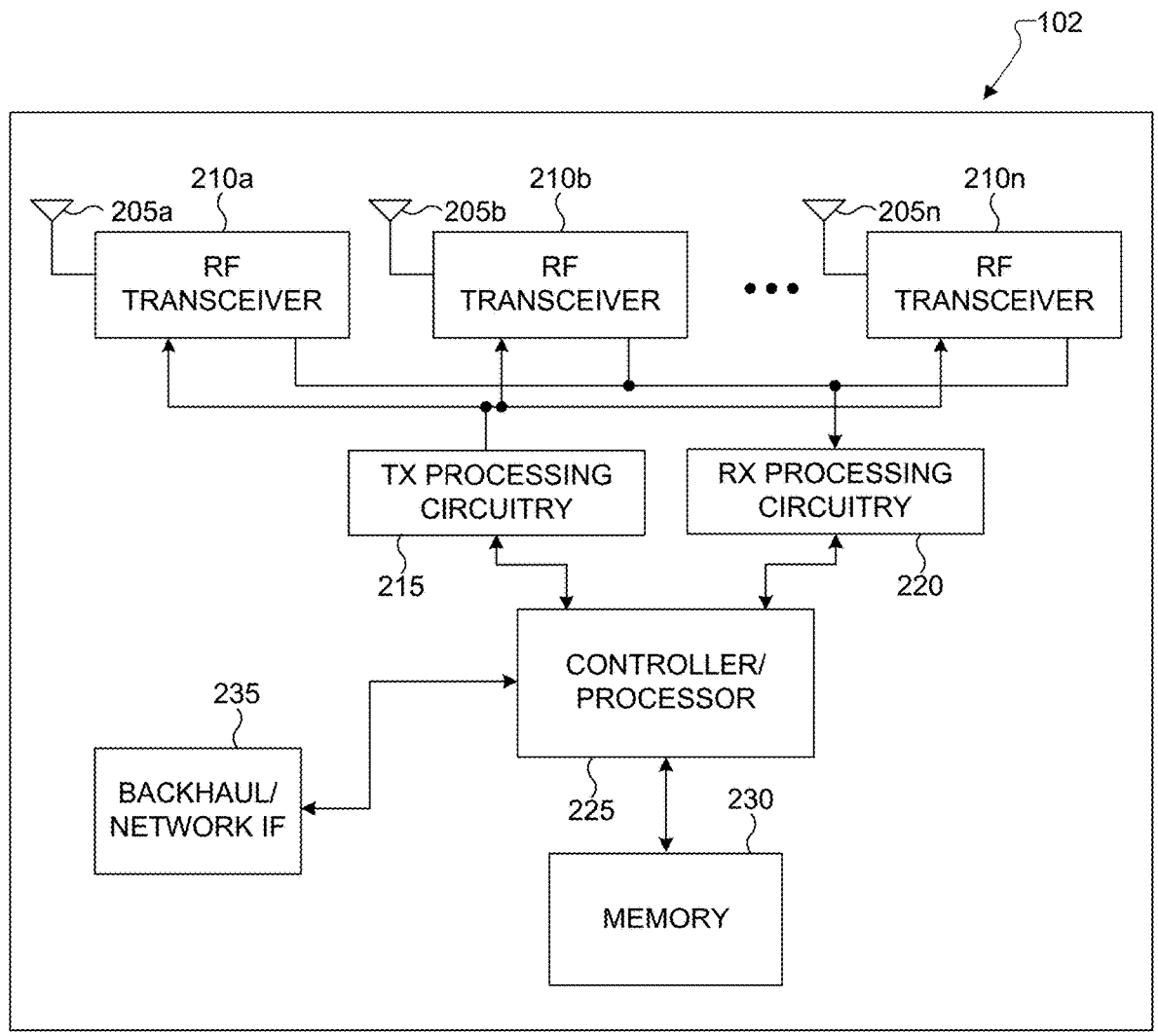
FIG. 2 illustrates an example gNB according to embodiments of the present disclosure.
Figure 3:
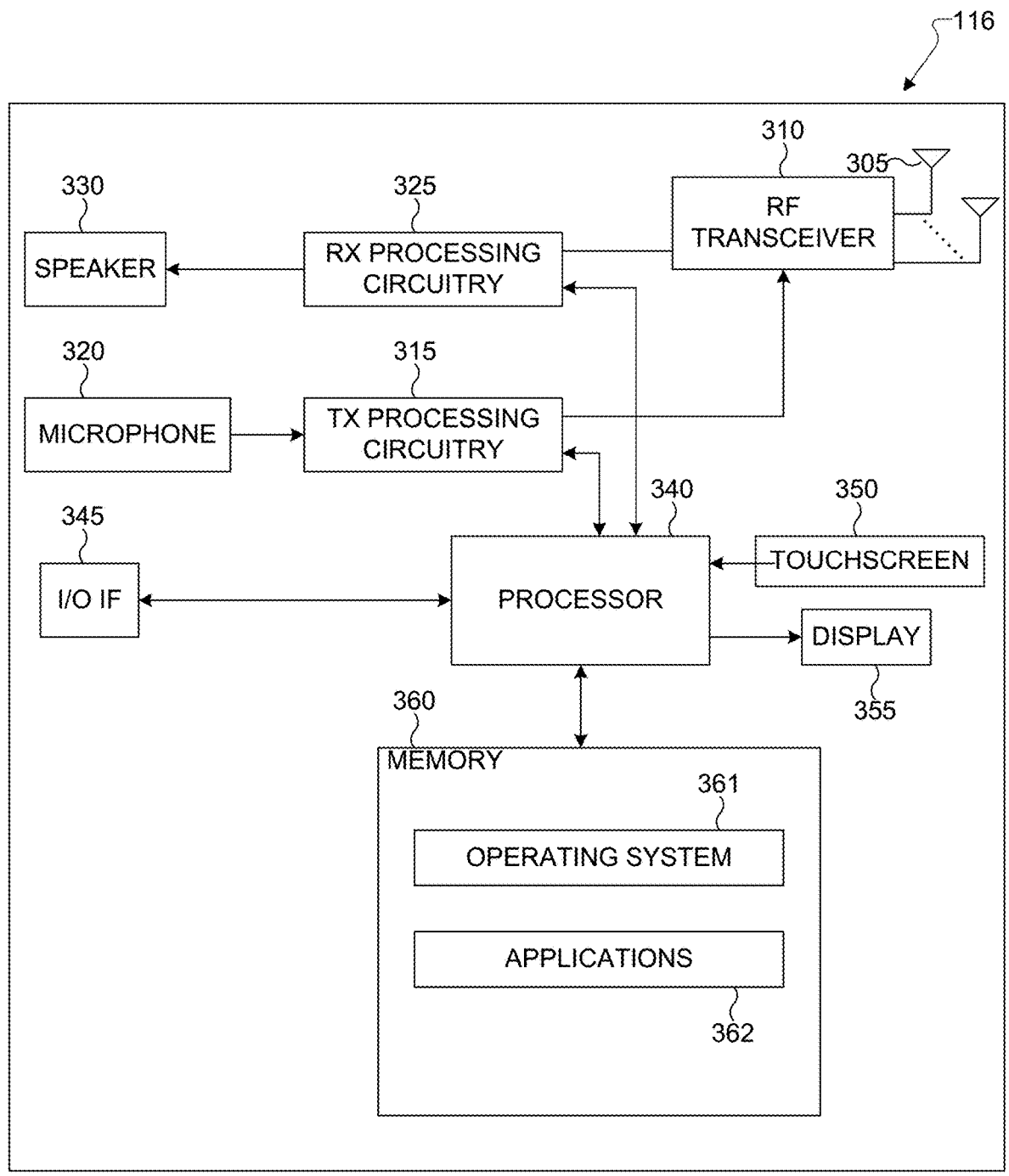
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
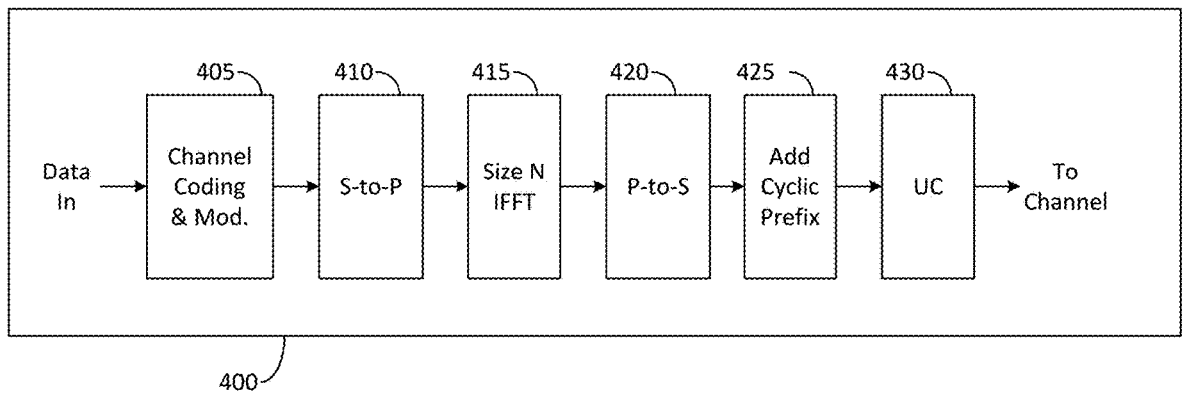
FIG. 4A illustrates a high-level diagram of an orthogonal frequency division multiple access transmit path according to embodiments of the present disclosure.
Figure 4B:
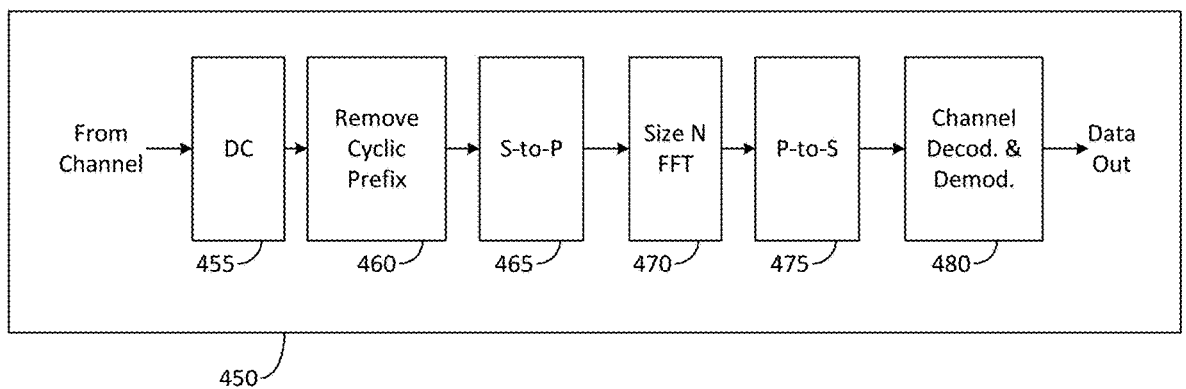
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
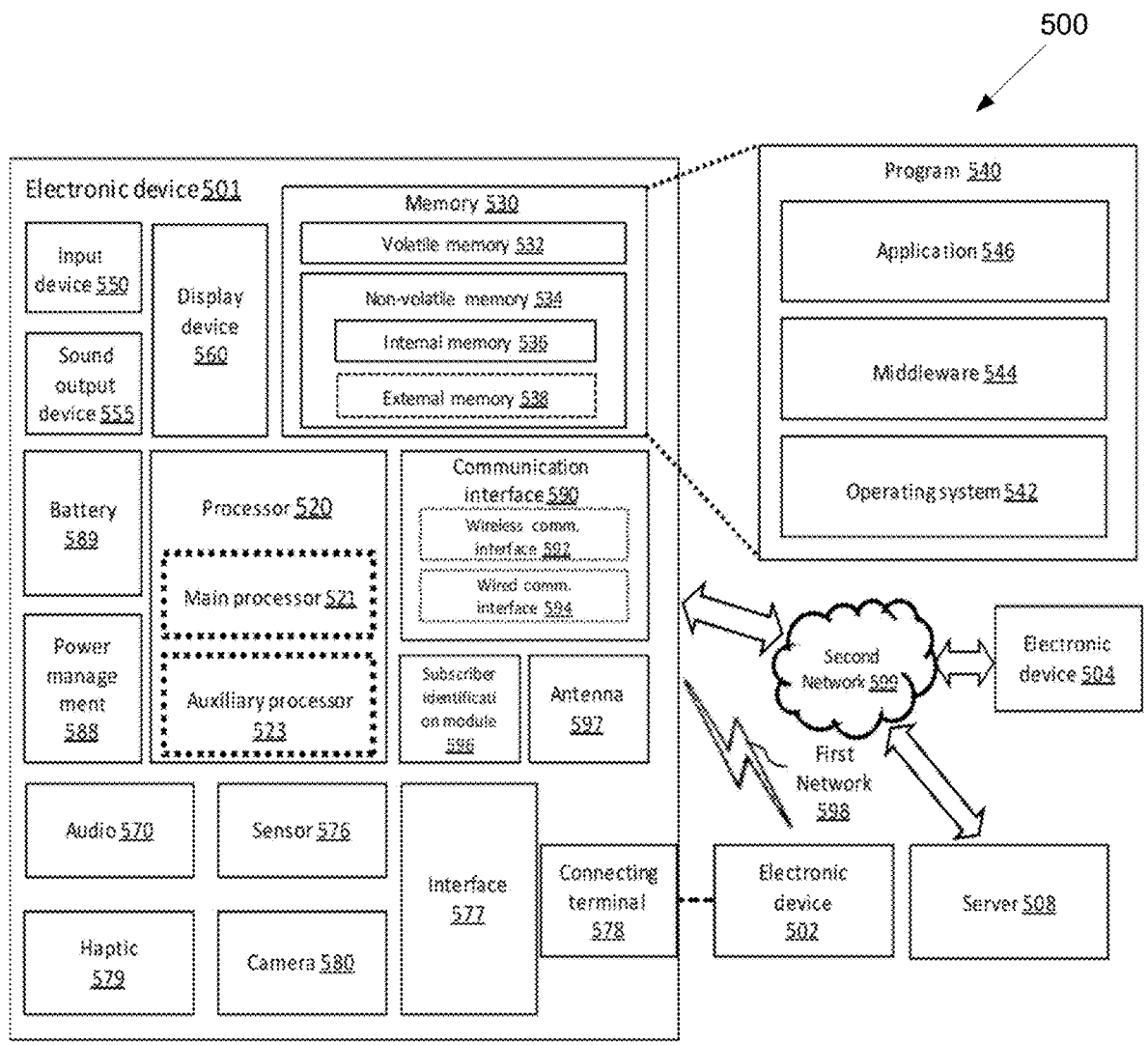
FIG. 5 illustrates an example electronic device according to embodiments of the present disclosure.

FIG. 5 illustrates an example network configuration 500 according to embodiments of the present disclosure. The embodiment of the network configuration 500 illustrated in FIG. 5 is for illustration only. FIG. 5 does not limit the scope of the present disclosure to any particular implementation. As illustrated in FIG. 5, an electronic device 501 may be performed a function or functions of 111-116 as illustrated in FIG. 1. In one embodiment, the electronic device may be 111-116 and/or 101-103 as illustrated in FIG. 1.

PDs can be an electronic device. FIG. 5 illustrates an example electronic device 501 according to various embodiments. Referring to FIG. 5, the electronic device 501 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Figure 6:
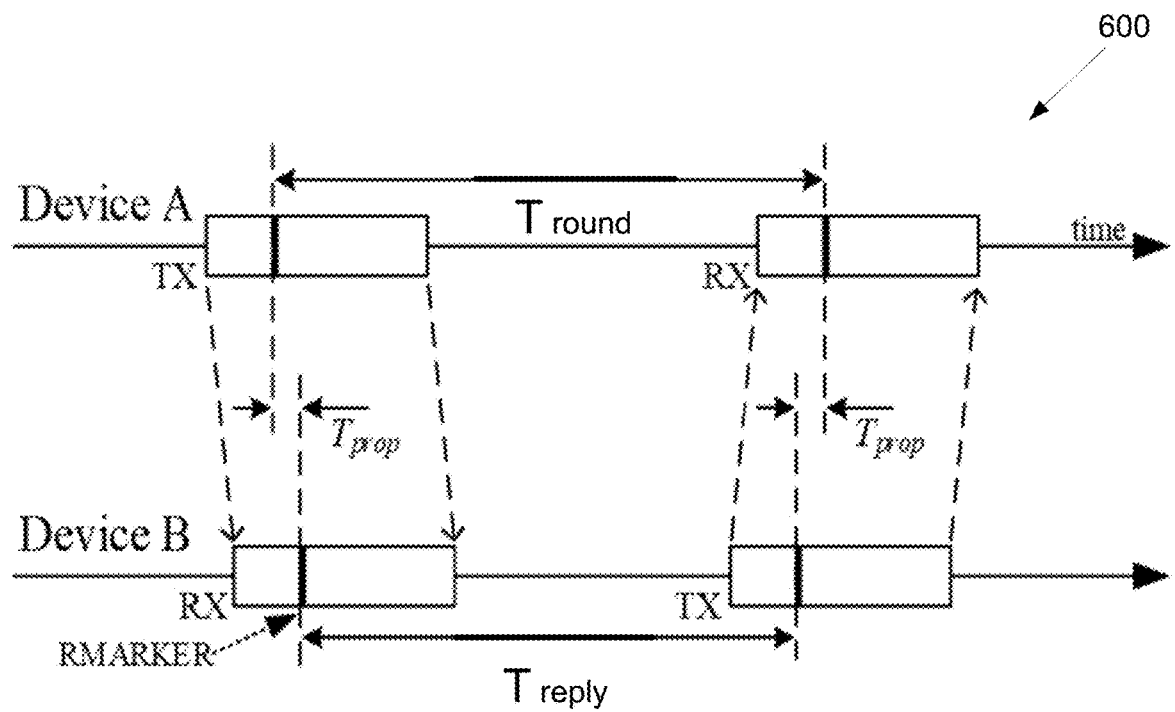
FIG. 6 illustrates an example single-sided two-way ranging according to embodiments of the present disclosure.

FIG. 6 illustrates an example single-sided two-way ranging 600 according to embodiments of the present disclosure. The embodiment of the single-sided two-way ranging 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. The single-sided two-way ranging 600 may be performed in the electronic device 501 as illustrated in FIG. 5.

Figure 7:
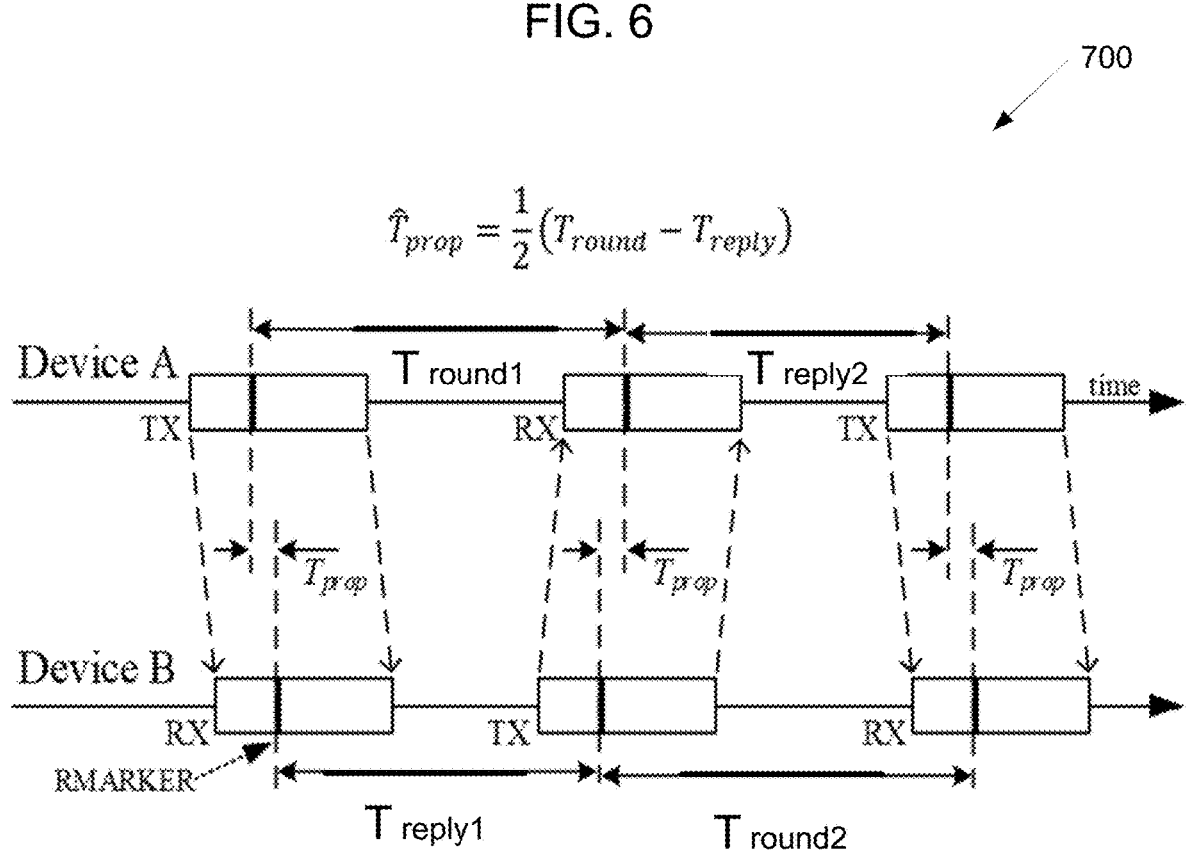
FIG. 7 illustrates an example double-sided two-way ranging with three messages according to embodiments of the present disclosure.

SS-TWR involves a simple measurement of the round-trip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation:

$$\hat{T}_{prop} = \frac{1}{2}(T_{round} - T_{reply}).$$

FIG. 7 illustrates an example double-sided two-way ranging with three messages 700 according to embodiments of the present disclosure. The embodiment of the double-sided two-way ranging shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. The double-sided two-way ranging with three messages 700 may be performed in the electronic device 501 as illustrated in FIG. 5.

DS-TWR with three messages is illustrated in FIG. 7, which reduces the estimation error induced by clock drift from long response delays. Device A is the initiator to initialize the first round-trip measurement, while device B as the responder, responses to complete the first round-trip measurement, and meanwhile initialize the second round-trip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

The resultant time-of-flight estimate from SS-TWR or DS-TWR can then be converted to range estimate, R, using $R = \hat{T}_{prop} \times c$ where c is the speed of light.

Figure 8:
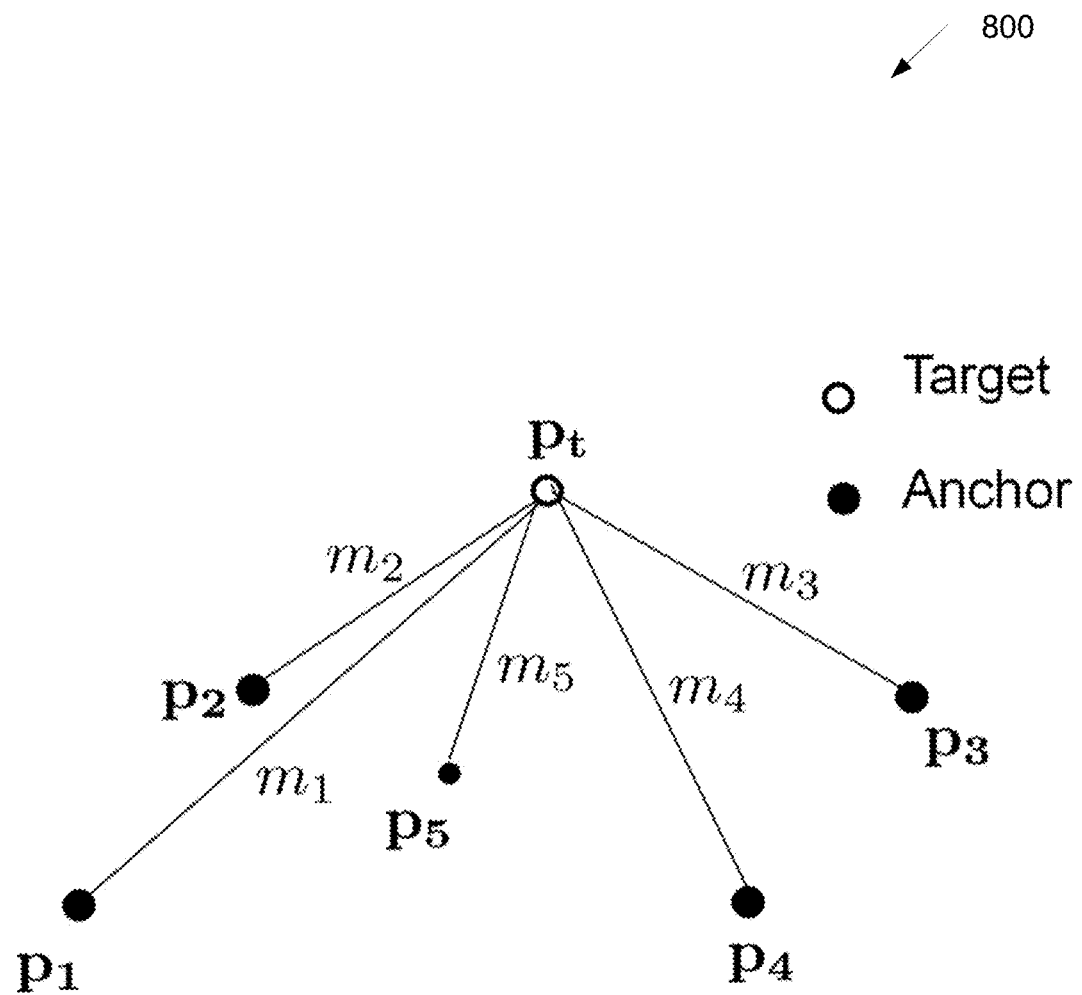
FIG. 8 illustrates an example localization of tag based on range measurements from anchors according to embodiments of the present disclosure.

FIG. 8 illustrates an example localization of tag 800 based on range measurements from anchors according to embodiments of the present disclosure. The embodiment of the localization of tag 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

An exemplary setup for localization of a tag based on range measurements from anchors is shown in FIG. 4. The anchors' coordinates are assumed known, with $i^{th}$ anchor at $p_i = (x_i, y_i, z_i)$, for i=1, 2, . . . , N, where N is the number of anchors. The tag (or target) location $p_t = (x_t, y_t, z_t)$ is to be estimated. For 2D localization problem, two out of three coordinates, such as just $(x_t, y_t)$, are estimated. The $i^{th}$ anchor performs a measurement $m_i$ on the tag, where m's can be range measurements. Localization schemes typically attempt to perform the inverse mapping from the measurements to the location of the target.

Localization result can be generated or calculated for each time instance where the range measurements from the anchors are available. This can result in frequent localization processing if the range measurements from anchors are updated frequently. Frequent localization may not be necessary if the result of the localization does not trigger any action for the applications that make use of the localization results, which can be the case if the location of the target is outside of the region of interest for possible action, or if the localization result may be considered inaccurate or unreliable which can be the case if the target is too far from the anchors.

In the present disclosure, a cell or grid based localization method is introduced which takes ranging measurements and anchor location as inputs and generates the location of the target in terms of the cell or the state of the target with a certain confidence measure. The localization engine using the method tessellates the region of localization ($\mathcal{R}$) into cells ($c\_1, c\_2, \ldots, c\_M$) and at each step provides confidence values that the target is in the i-th cell (i=1, 2, . . . , M). A cell is essentially a specific localization space or region of interest. A certain action can be triggered when the method identifies that the target is in the space with sufficiently high confidence.

Figure 9:
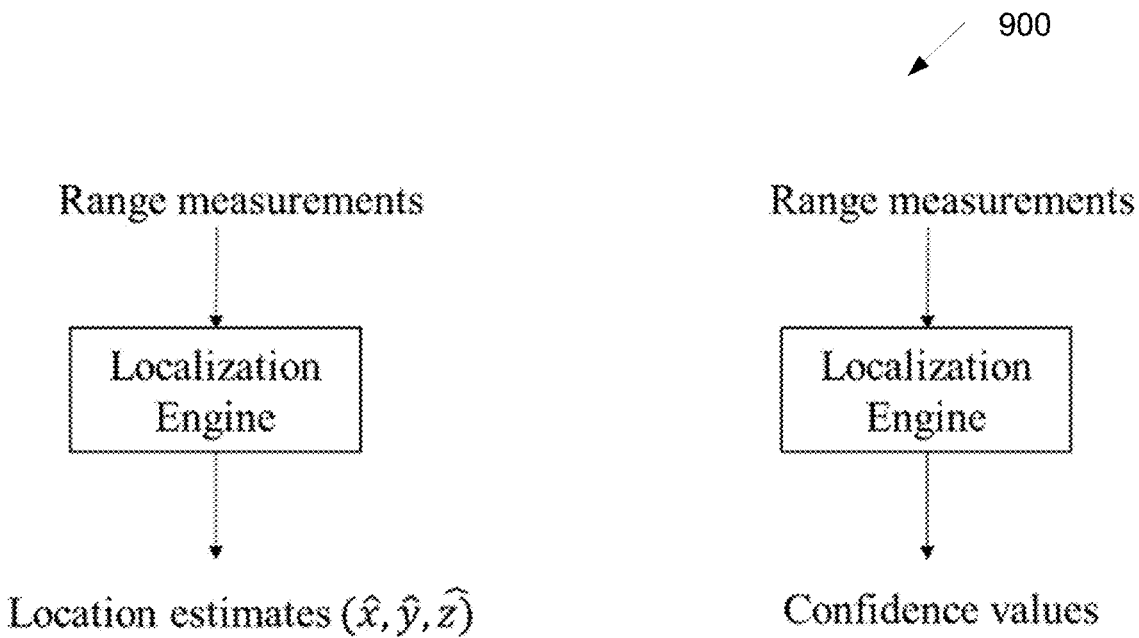
FIG. 9 illustrates an example two localization engine frameworks according to embodiments of the present disclosure.

FIG. 9 illustrates an example two localization engine frameworks 900 according to embodiments of the present disclosure. The embodiment of the two localization engine frameworks 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 shows two different localization frameworks, where the framework on the right is the focus of this disclosure. Although range measurement is shown in FIG. 9, it is noted that other types of measurements, such as time difference of arrival, angle of arrive, time of arrival can also be applied for the framework.

Figure 10:
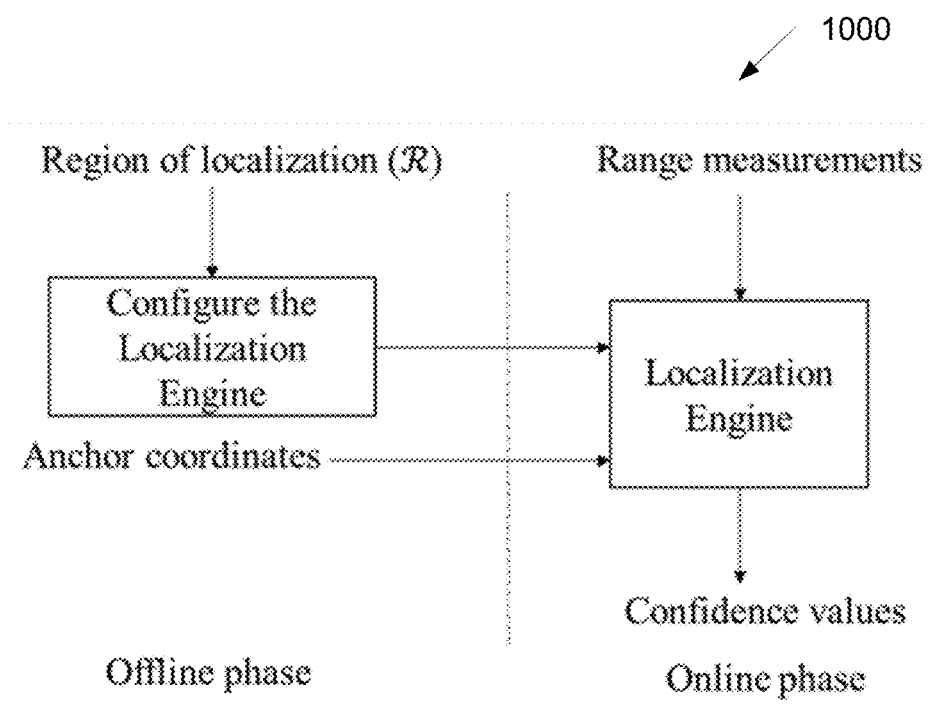
FIG. 10 illustrates an example localization engine architecture according to embodiments of the present disclosure.

FIG. 10 illustrates an example localization engine architecture 1000 according to embodiments of the present disclosure. The embodiment of the localization engine architecture 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

An example architecture of the localization engine is as shown in FIG. 10. The methods of constructing the target state space, applying state transition, computation of the cell likelihood and the corresponding state likelihood are described in this disclosure. Construction of the target state space and the state transition can be included in the "configure the localization engine" block, while the computation of the cell and/or state likelihood based on measurements can be performed in the "localization engine" block.

In order to formalize the state space, terminologies from graph theory may be used. In the present disclosure, the graph theory fundamentals are considered for completeness. An undirected graph is built upon the vertex set V that contains n elements, represented as $V=\{v_1, v_2, \ldots, v_n\}$. Vertices are also called nodes. An edge, denoted by a pair (i,j) where $v_i$, $v_j \in V$, indicates the existence of a relationship between pairs of vertices in V. The set of all edges of a graph is denoted $E \subseteq V^2$. The vertex set V and set of edges E define a (finite, simple) graph G=(V;E).

If an edge exists between $v_i$ and $v_j$, these vertices are adjacent. The n×n adjacency matrix A(G) contains the adjacency relationships between the vertices, where the entry on the i-th row and j-th column, denoted by $A(G)_{i,j}$, is 1 if (i,j)∈E and 0 otherwise. The non-zero entries in the i-th row of A(G) give the set of vertices that are connected to vertex i, called the neighborhood $\mathcal{N}(i)=\{v_j \in V | i \neq j\}$ and (i,j)∈E. The neighborhood of a vertex v is denoted as $\mathcal{N}(v)$ which is the collection of vertices which are adjacent to v.

In the present disclosure, self-localizable mobile devices are considered and methods for performing the on-device localization using the range measurements from the anchors are described. Other types of measurements, such as time difference of arrival, angle of arrive, time of arrival can also be applied with our framework with straightforward modifications. The localization methods can also be executed at the anchors or at a central unit controlling the anchors. The mobile device (also called the target or tag) is assumed to move in a region $\mathcal{R}$ that defines the kinematic region of interest for this problem. The region $\mathcal{R}$ may have boundaries defined in terms of bounds on spatial coordinates.

Examples of $\mathcal{R}$ are room, gallery, hallway, vicinity and inside of a car etc. For the sake of explanation, it may be assumed that there is one target present in $\mathcal{R}$ so that the tracking problem becomes the estimation of the state of that target (possible state definitions of the target are provided later). However, note that the method can be easily extended to multiple-target tracking case which can be viewed as a set of single target tracking methods operating in parallel.

In one embodiment, a discrete state space can be constructed with finite number of states ($\{s_i\}$, i=1, 2, ..., S). This state space may be specified with a target/tag state graph ($G_s$) where each node corresponds to a state and each edge denotes a state transition which is associated with certain probability (q(s,s')), known as state transition probability.

The target state ($s_{t_K}=s_i$) at the instant $t_K$ can be a vector of components where some of the components are kinematic and including but not limited to position, velocity, and possibly acceleration. There can be additional components that may be related to the identity or other features of the target. For example, if one of the components specifies target type, then that component may also specify information such as radar cross section, coefficients of drag, and mass for airborne targets; in the case of naval targets, it might specify radiated noise levels at various frequencies and motion characteristics (e.g., maximum speeds). The state space may vary from problem to problem depending on the nature of the target to be tracked and the sensor (or other) information to be received. In order to use the recursion given in the present disclosure, there are additional requirements on the target state space. The state space can be rich enough that (1) the target's motion is Markovian in the chosen state space and that (2) the sensor likelihood functions depend only on the state of the target at the time of the observation.

Figure 11:
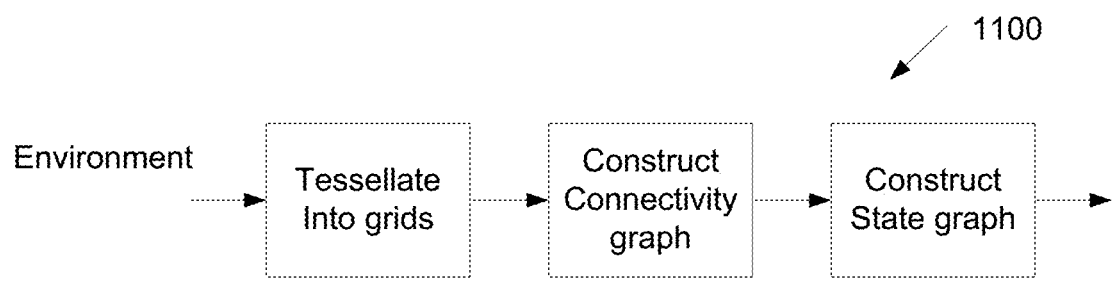
FIG. 11 illustrates an example construct state transition graph from the environment according to embodiments of the present disclosure.

FIG. 11 illustrates an example construct state transition graph 1100 from the environment according to embodiments of the present disclosure. The embodiment of the construct state transition graph 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

The construction of the state-space is highly non-trivial and problem specific. Two schemes are provided to formulate the state-space for the localization engine. The basic steps are illustrated in FIG. 11. The design of the other components of the localization engine can closely depend on the choice of these schemes. In order to construct the discrete state space, the first step is to tessellate $\mathcal{R}$ into a finite set of cells (also known as grids) indexed by 1 ..., m where $c_1, \ldots, c_M$ denotes the centroids of the cells. For illustrative purposes, localization is considered in a subset of a two-dimensional space (i.e., $\mathcal{R}$ is a bounded subset of a plane).

However, the construction can be extended to higher dimensions such as three dimensions. The cells can be any convex polygon including but not limited to hexagonal and square lattices and Voronoi tessellation. Different cell can have different shapes and sizes. For the sake of explanation, the tessellated environment (which can be also called the "grid world") is provided as a connectivity graph $G_c=(V_c, E_c)$ where $V_c=\{c_1, c_2, \ldots, c_M\}$. The definition of the adjacency matrix of $G_c$ (equivalently the definition of $E_c$) can be design specific. One example construction is to define adjacency according to the Delaunay triangulation formed by the nodes of $V_c$.

Figure 12:
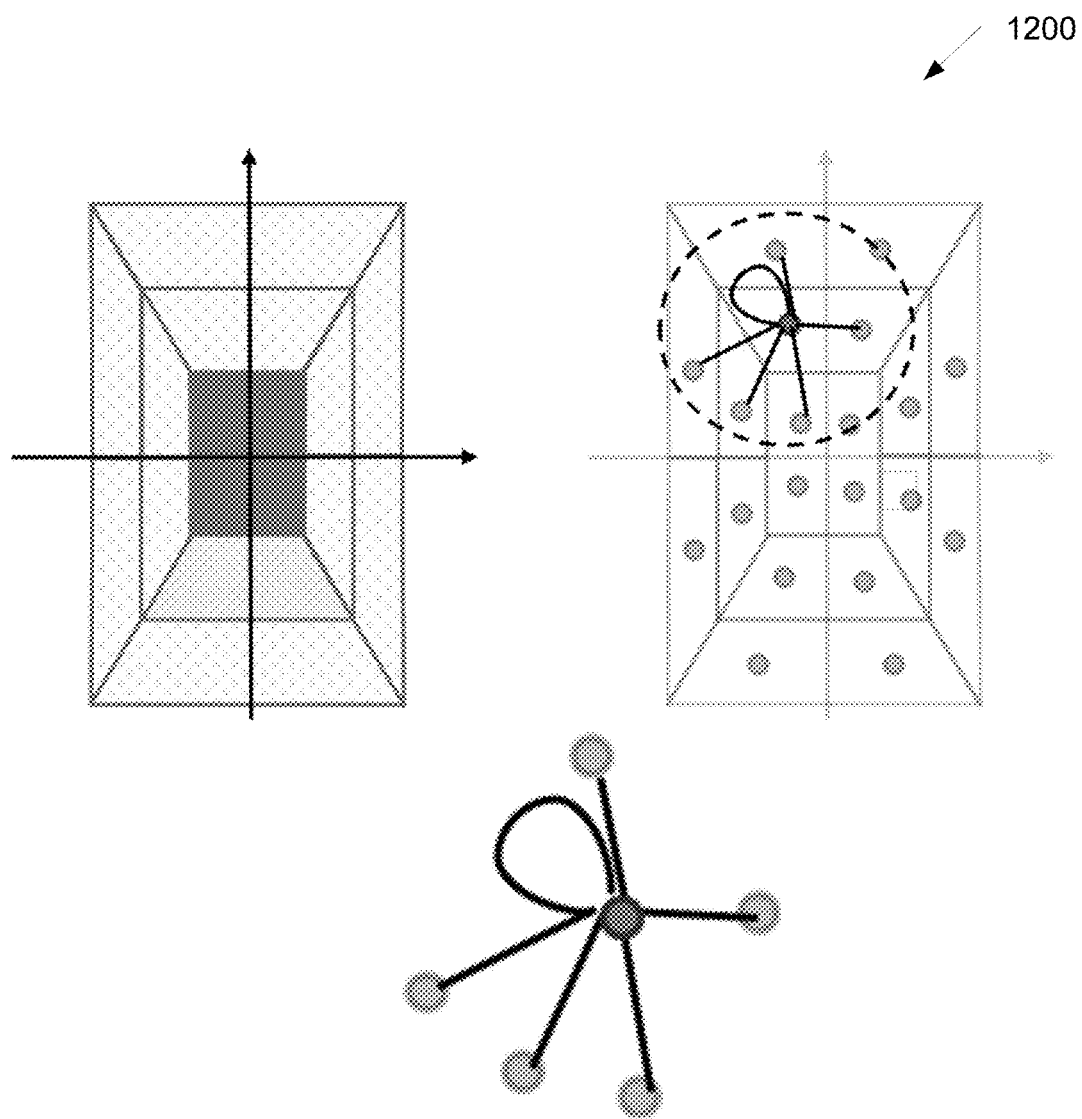
FIG. 12 illustrates an example constructing connectivity graph from the grid world for a 2D scenario according to embodiments of the present disclosure.

FIG. 12 illustrates an example constructing connectivity graph 1200 from the grid world for a 2D scenario according to embodiments of the present disclosure. The embodiment of the constructing connectivity graph 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, an example construction of $G_c$ is provided where two nodes are adjacent if and only if the grids share a common edge.

FIG. 13 illustrates an example constructing connectivity graph 1300 from the grid world for a 2D scenario for car access according to embodiments of the present disclosure. The embodiment of the constructing connectivity graph 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

In one example, the region of localization $\mathcal{R}$ can be the space surrounding a car as shown in left most figure in FIG. 13. The region $\mathcal{R}$ can be tessellated into cells as shown in the middle and right most figures in FIG. 13. The physical interpretation of each cell label is shown in TABLE 1. As shown in FIG. 13, a cell can represent a physical space inside or outside the car. The cells within the car can be defined to be corresponding to the seats in the car (cell 1, 2, 3, 4). The cells of possibly different shapes and sizes can be designed such that the localization of the target (i.e. identification of the cell in which the target is located) can trigger a subsequent action, e.g. in the upper layer, based on the localization result.

For the car example, a cell can cover the approximately 2 meters radius from the car door outside of the car (cell 12 as illustrated in FIG. 13), with the purpose of unlocking the car when the tag is localized to be in the cell. Another cell can cover the space corresponding to the driver seat inside the car (cell 1 as illustrated in FIG. 13), with the purpose of starting the car engine when the tag is localized to be in the cell.

TABLE 1

Cell labels

| Cells | Description |
|---|---|
| 1 | Inside car (front left) |
| 2 | Insider car (front right) |
| 3 | Inside car (back right) |
| 4 | Inside car (back left) |
| 5 | Front left door |
| 6 | Car front |
| 7 | |
| 8 | Front right door |
| 9 | Back right door |
| 10 | Car back |
| 11 | |
| 12 | Back right door |
| ≥13 | Far away regions |

Having constructed the connectivity graph, the target state graph can be constructed by following either of the two following schemes. Note that these two schemes may not be the only way of constructing the target state graph. For example, there can be hybrid schemes combining scheme 1 and scheme 2 for formulating the target state graph.

In one example of scheme 1, the target state graph is same as the connectivity graph ($G_s=G_c$).

Figure 14:
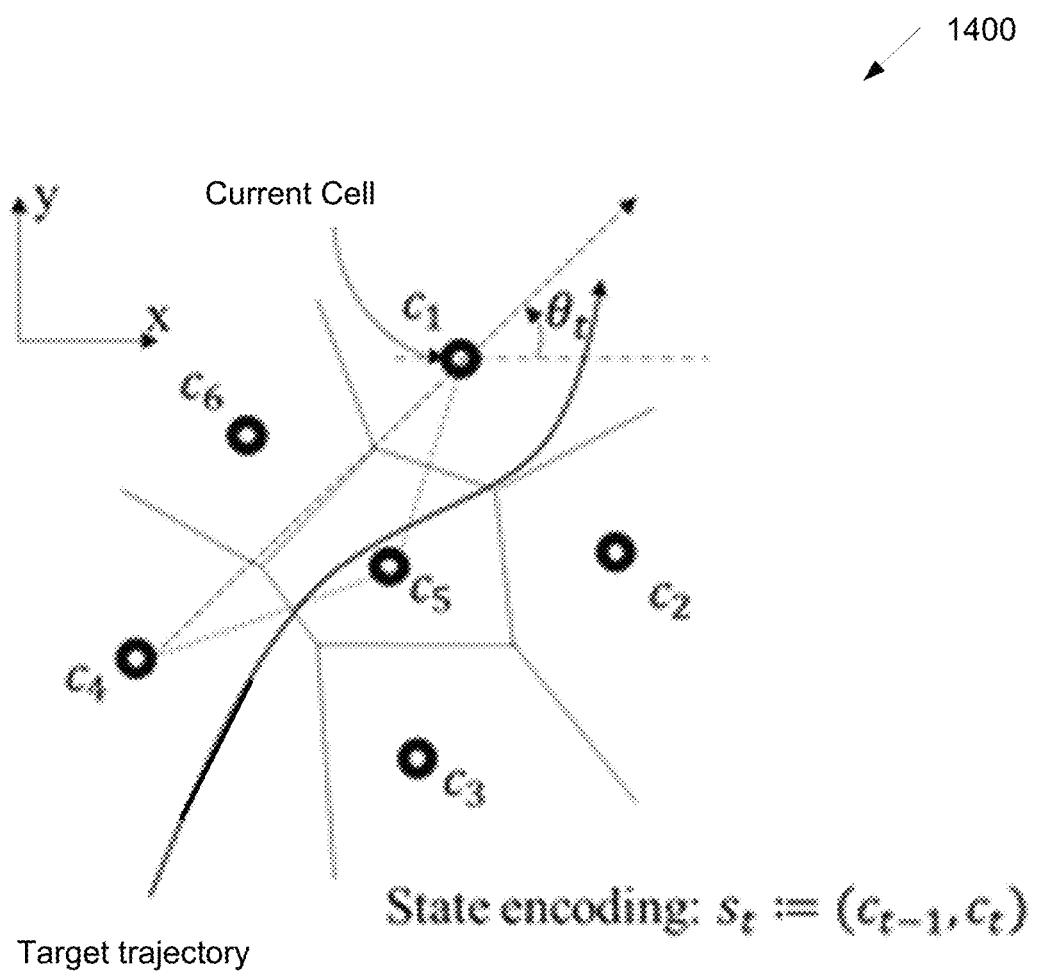
FIG. 14 illustrates an example target state graph to capture information on target's heading (scheme 2) according to embodiments of the present disclosure.

In one example of scheme 2, the target state graph $G_s$ is not same as the connectivity graph. One way to construct such a target state graph is to utilize the heading of the target. FIG. 14 shows why $G_s \neq G_c$ for a target motion with certain heading direction (which is likely the case when the target or equivalently the mobile device is held at hand or kept in pocket or bag and the person is walking in $\mathcal{R}$).

FIG. 14 illustrates an example target state graph 1400 to capture information on target's heading (scheme 2) according to embodiments of the present disclosure. The embodiment of the target state graph 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As targets move along the connectivity graph, their state is denoted by a pair of nodes $s=(p,c) \in S$, where $c \in V_c$ is the target's current node and $p \in V_0$ is its previous node. If the target transitions to a new state $s'=(p', c')$, then $p'=c$. Thus, for a given occupancy graph $G_c$, the target state space is $S=\{(p,c) \subseteq V_c \times V_c:(p,c) \in E_c, (c,p) \in E_c \text{ or } p=c\}$. Each state in $G_s$ is enumerated to give the nodes $V_s=\{s_1, \ldots, s_S\}$ and define a directed target state graph $G_s:=(V_s, E_s)$, where the edges $E_s$ represent possible transitions between target states. Let $R=\{(p,c) \in S:p=c\}$ denote the subset of states where the target is at rest. These states are called as rest states. The other states are called as dynamic states. The construction of $G_s$ from $G_c$ is illustrated in FIG. 15.

Figure 15:
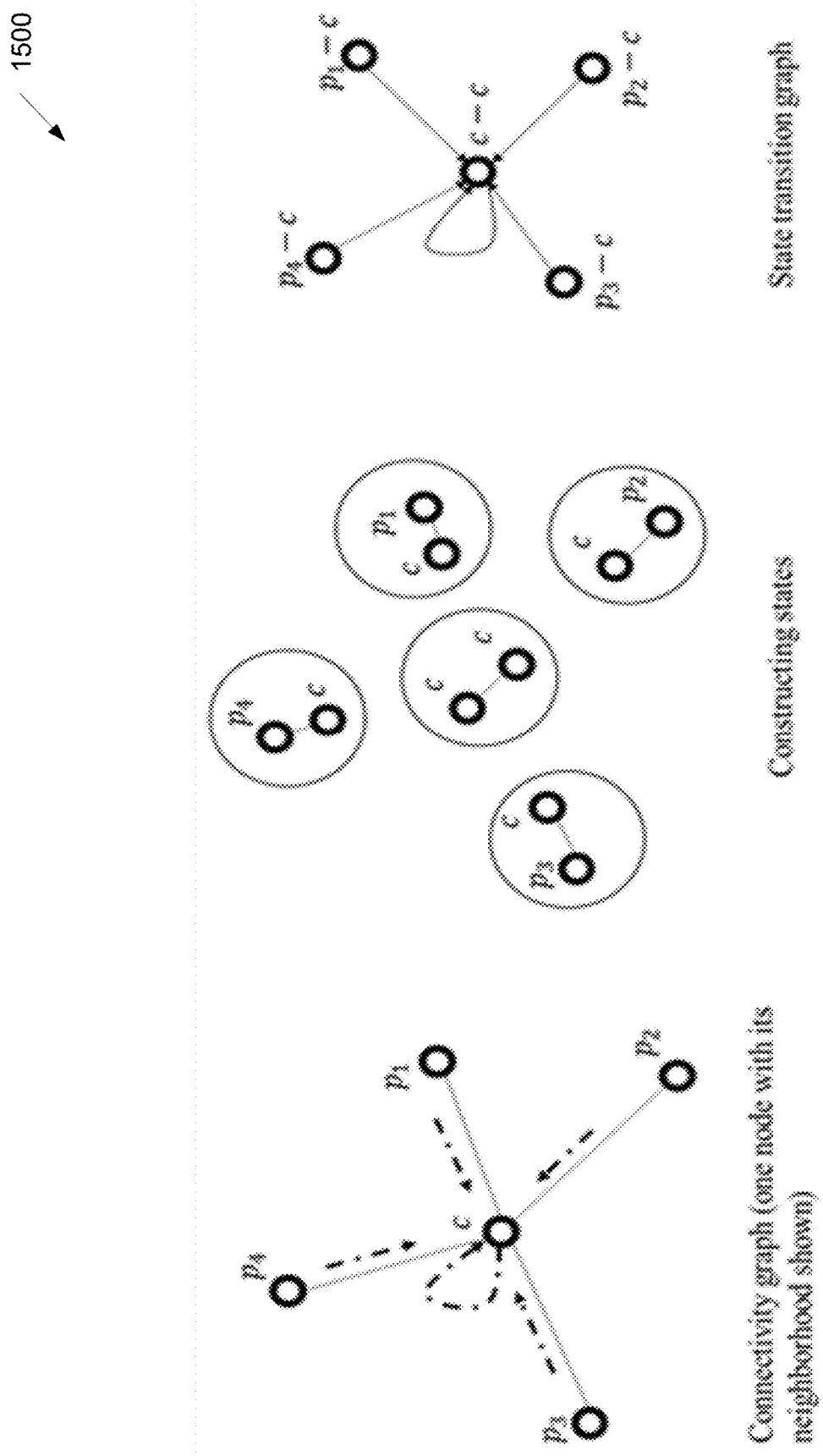
FIG. 15 illustrates an example construction of target state graph from connectivity graph according to embodiments of the present disclosure.

FIG. 15 illustrates an example construction of target state graph 1500 from connectivity graph according to embodiments of the present disclosure. The embodiment of the construction of target state graph 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

In the present disclosure, a method using the range measurements from the anchors and estimate the location of the target in $\mathcal{R}$ is provided. FIG. 16 shows the main blocks of the localization engine.

FIG. 16 illustrates an example localization engine 1600 according to embodiments of the present disclosure. The embodiment of the localization engine 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

As illustrated in FIG. 16, the localization engine 1600 calculates an initial state probabilities in block 1602, applies state transition in block 1604, performs ranging operation in block 1606, computes likelihood in block 1608, updates state probabilities with likelihood block in block 1610, and computes confidence values for each cells in block 1612. The localization engine 1600 further applies state transition in block 1604 after computing confidence values for each cell in block 1612.

The localization engine starts with an initial distribution of states (i.e. $p(s_i)$, i=1, 2, . . . , S) and updates these probabilities iteratively over time. There are two update stages. First is to apply the state transition probabilities governed by a dynamics model. Second is to update the state probabilities based on the likelihood values computed from the ranging measurements reported by the anchors. At the end of each iteration, the localization engine outputs the confidence values (in terms of probabilities, likelihood, log-likelihood etc.) indicating the probability of the target's current location in a cell. These confidence values can be considered to be the soft information on the location on the target which can be used as an extra information (e.g. reliability score) to perform any form of hypothesis testing (including but not limited to log-likelihood ratios) to indicate the current location of the target in terms of the cell index.

In the present disclosure, the building blocks of the localization engine are described.

The block "apply state transition" in FIG. 16 (e.g., 1604) is described. Note that this block can be designed offline and may not need to be updated during the online process of localization.

The state transition probabilities $q(s|s')$ denotes the probability of transition from state s' to s. The state transition probabilities can be interpreted as weights on the directed graph $G_s$. Note that the assignment of state transition probabilities follows some assumption on the target motion (which may be specified in terms of a target motion model).

In one example of scheme 1, any valid assignment of state transition probabilities that ensure $\Sigma q(s|s')=1$ for a given $s' \in V_s$.

In one example of scheme 2, this construction is related to the target state graph construction scheme which encodes the current and the previous cell of the target in one state. As indicated before, the state construction in this way enables us to model the heading of target's motion. In one example of state transition probability formulation, for a particular state, which is not a rest state $s=(p,c)$, $s \notin R$, the target heading angle $\theta(s)$ may be computed as $$\theta(s) = \arctan\left(\frac{y_c - y_p}{x_c - x_p}\right).$$

If s is a rest state, then the heading angle is undefined. Also, there is a probability p(s) for all dynamic states indicating the probability to transition to a rest state. With the two definitions, one possible design of the state transition probabilities may be the following. q(s|s') is equal to $p_s$, if s' is a rest state, $(1-p_s)$w(s,s'), if s' is not a rest state and s belongs to the neighborhood of s (i.e. $s \in \mathcal{N}(s')$) in $G_s$, and 0 otherwise. Here w(s,s') is a bias function that satisfies $\Sigma_{s \in \mathcal{N}(s')}$ w(s,s')=1. Bias functions are related to the target motion model. Bias functions for target motion with heading are generally constructed as: w(s,s')=$f(\Delta\theta(s,s'))$, where $\Delta\theta(s, s')$ is the angular difference in heading between two states.

The state transition probabilities are used to update the state probabilities using the following pseudocode as shown in TABLE 2.

TABLE 2

Pseudo code for state transition probabilities
Algorithm: Apply State Transition 1. For i = 1: M
2. p(s) ← $\Sigma_{S'}$ p(s')q(s|s')
3. EndFor The present disclosure relates to the blocks "compute likelihood (e.g., 1608)" and "update state probabilities with likelihood" (e.g., 1610) in FIG. 16. The block "compute likelihood" can be elaborated as the block diagram in FIG. 17.

FIG. 17 illustrates an example computation of the state likelihoods 1700 according to embodiments of the present disclosure. The embodiment of the computation of the state likelihoods 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

Let $Y_k$ be the set of range measurements available at time $t_k$. Let $y_k$ denote a value of the random variable $Y_k$. Then the likelihood function computes the likelihood of the target's being in cell i at time $t_k$ given the measurements $Y_k=y_k$. Other types of measurements, such as time difference of arrival, angle of arrival, time of arrival, etc. can also be used as inputs with the appropriate mapping or function from the measurements and the anchor locations to the target location.

The present disclosure provides a method of constructing the likelihood function from the range measurements. Note that the target location is a non-linear function of the anchor locations and range measurements. This non-linearity can be taken into account during the formulation of the likelihood function. Note that given any error distribution, one can formulate the likelihood function from the joint probability distribution of the measurement errors.

For example, assuming that the measurement errors are Gaussian random variables with covariance Q and the target has an estimate of Q, the likelihood function can be written as $$L(c_{t_k} = c) \propto \int_{(x,y,z) \in c} \exp\left(-\frac{1}{2}(y_k - f(x, y, z))^T Q^{-1}(y_k - f(x, y, z))\right) dxdydz$$

where $f(x, y, z) = [\{((x - x_{a_i})^2 + (y - y_{a_i})^2 + (z - z_{a_i})^2)^{\frac{1}{2}}\}]^T.$ Here $(x_{a_i}, y_{a_i}, z_{a_i})$ denotes the coordinates of the i-th anchor. For each cell, the above likelihood function is evaluated by the computation of the numerical integration. After computing the cell-likelihood for each cell, the next step is to compute the likelihood of each state in the target state graph.

In such embodiment of scheme 1, the cell likelihoods are directly translated into state likelihoods. For scheme 2, the following pseudocode converts the cell-likelihoods to state-likelihoods as shown in TABLE 3.

TABLE 3

Pseudo code for converting the cell-likelihoods to state-likelihoods
Algorithm: Convert cell-likelihood to State-likelihood (scheme 2)

1. For i = 1: M
2. Find s such that s = (p, $c_i$)
3. L(s) ← L($c_{t_K}$ = $c_i$)
4. EndFor Finally, the state probabilities can be updated by the likelihoods as follows. Note that step 3 is the normalization step used to convert the state confidence values to valid state probability values such that the sum of the state probabilities is unity, as shown in TABLE 4.

TABLE 4

Pseudo code for updating state probabilities with likelihood
Algorithm: Update state probabilities with likelihood 1. For i = 1: M
2. Confidence(s) ← p(s)L($c_{t_K}$ = $c_i$)
3. p(s) = Confidence(s)/C
4. EndFor The confidence of each state is used to compute the cell confidence values which are output of the localization engine at each iteration. For scheme 1, the cell confidence values are equal to the state confidence values. For scheme 2, the cell confidence values are computed according to the following pseudocode as shown in TABLE 5.

TABLE 5

Pseudo code for computing cell confidence from state confidence
Algorithm: Compute cell confidence from state confidence (scheme 2)

1. For i = 1: S
2. s = (p, c)
3. Confidence(c) ← Confidence(c) + confidence(s)
4. EndFor The final decision on the state (or a subset of it) at any given time can be obtained from the state with the largest state probabilities at the time, or a weighted average of the state according to the state probabilities at the time.

Extended Kalman filter (EKF) can be used to estimate and track the position of a tag based on the range measurements from the tag to multiple anchors. An EKF algorithm assumes a dynamic model for the tag. The dynamic model provides prediction to the trajectory of the tag according to the model, and the algorithm uses measurements to correct the prediction and generate a location estimate of the tag. Depending on the environment, the position of the tag relative to the anchors, and the actual trajectory of the tag, and others, one EKF model may produce a better localization and tracking result compared to another EKF model. In this disclosure, localization and tracking solutions which can adapt to multiple EKF models are described.

Figure 18:
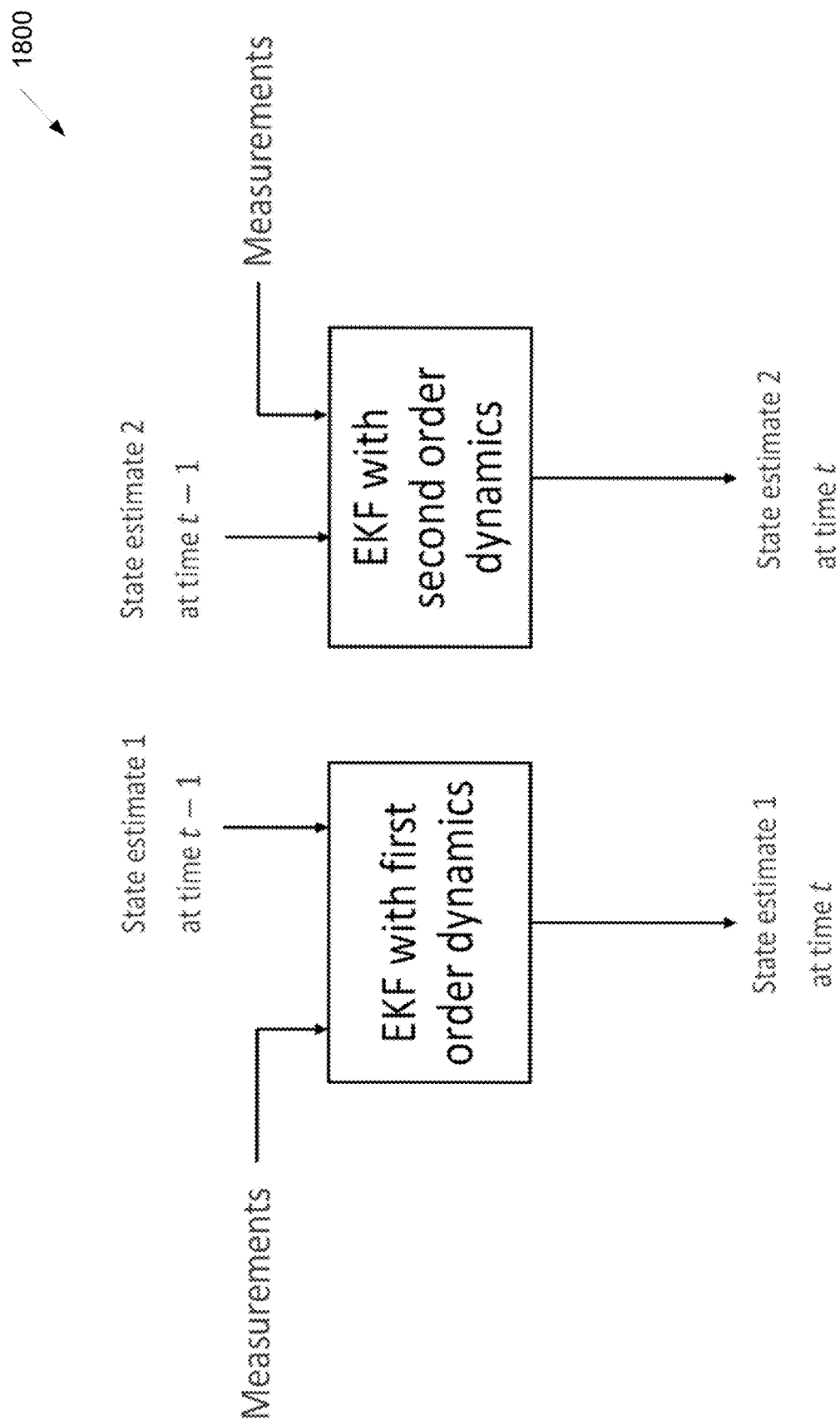
FIG. 18 illustrates an example EKF models according to embodiments of the present disclosure.

FIG. 18 illustrates an example EKF models 1800 according to embodiments of the present disclosure. The embodiment of the EKF models 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

FIG. 18 shows two example EKFs with two different dynamic models, namely EKF with first order dynamics, and EKF with second order dynamics. More generally, there can be M dynamic models. This disclosure provides methods to adapt to multiple EKF models. The methods include methods to mix the state estimates of the EKF, methods to perform model update, methods to compute model likelihood and methods to combine state estimates. This disclosure also provides methods to adjust or adapt model likelihood based on other inputs.

Quality of range measurements impact the accuracy of localization and tracking. When range measurements are less reliable (or are more error prone), certain type of modeling of state dynamics for KF/EKF provides more accurate results than other models. When the scenario changes, the KF/EKF model(s) providing more accurate localization and tracking can also change.

For example, under a very reliable measurement scenario (such as the line of sight (LOS) scenarios), it may be useful to have second order dynamics model as process with 6 states since the model tracks the position and velocity (or equivalently the heading) of a target. However, when the range measurements are unreliable (such as non-LOS (NLOS) scenarios), the second order dynamics based 6 states, the accuracy of localization and tracking could reduce. In such a scenario, KF/EKF with first order dynamics as process with 3 states may provide better localization and tracking.

Similarly, when sufficient number of range measurements (or range measurements from all anchors) are available, the second order dynamics with 6 states may provide better localization and tracking. However, when there is a partial measurement loss of range measurements, with 6 states, the accuracy of localization and tracking could reduce.

In general, when the range measurements are more prone to errors or are unreliable, the first order dynamics model with 3 states, which has a lower dimensional state space may provide better results. This motivates us to design a localization and tracking with the mixture of M dynamic models with adaptive switching. The block diagram of this localization and tracking with M parallel EKF with multiple mixture models of dynamics is shown in FIG. 19.

Figure 19:
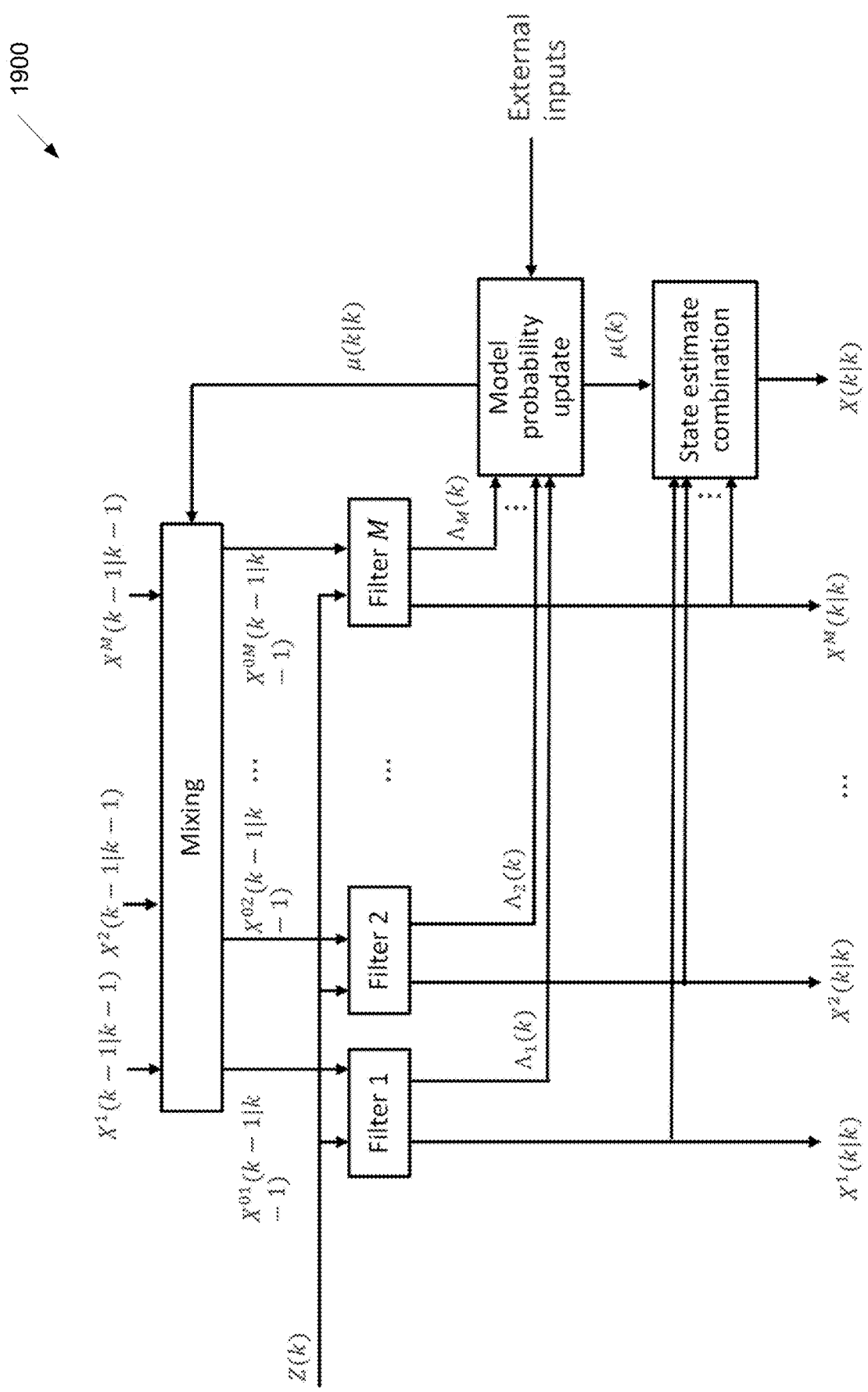
FIG. 19 illustrates an example M parallel EKF with multiple mixture models of dynamics according to embodiments of the present disclosure.

FIG. 19 illustrates an example M parallel EKF with multiple mixture models of dynamics 1900 according to embodiments of the present disclosure. The embodiment of the M parallel EKF with multiple mixture models of dynamics 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

FIG. 19 shows (1) multiple models with an EKF for each model (labeled as "model"), (2) model probability evaluator, (3) a mixer at the input of each EKF, and (4) an estimate combiner as the output of each EKF. The state estimates of the previous time step $(X^1, \ldots, X^M)$ is the input to the mixer, which computes the initial mixed state estimates for the filters, denoted as $(X^{01}, \ldots, X^{0M})$. Using the initial state estimates and observations (Z), the filters output the next state estimate $(X^1, \ldots, X^M)$ and the model likelihood $(\Lambda_1, \ldots, \Lambda_M)$.

Figure 20:
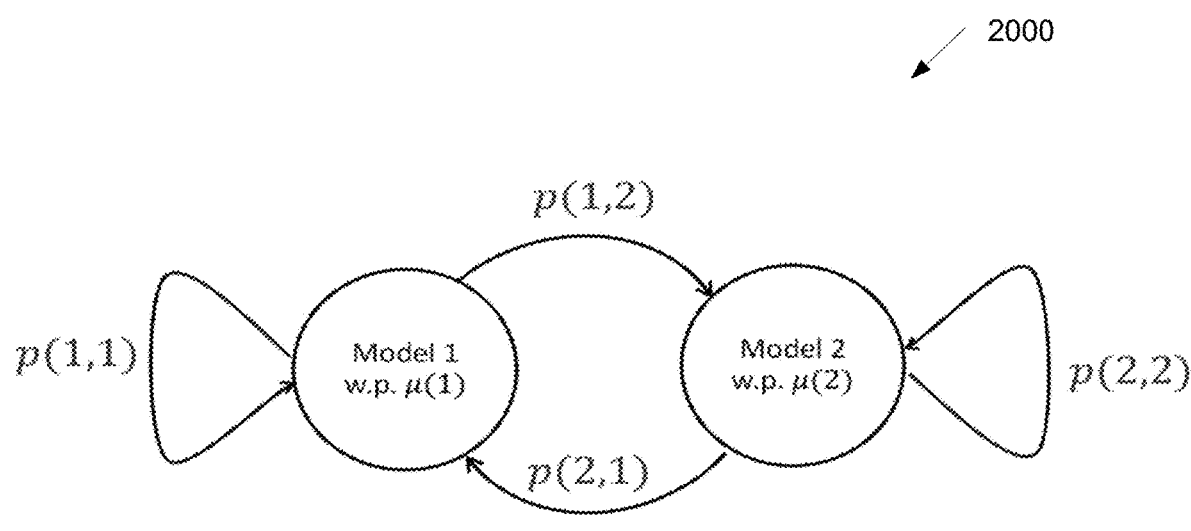
FIG. 20 illustrates an example Markov chain for model switching according to embodiments of the present disclosure.

FIG. 20 illustrates an example Markov chain for model switching 2000 according to embodiments of the present disclosure. The embodiment of the Markov chain for model switching 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

The model probability evaluator tracks the state of the model selection indicator (denoted as $r_k$ for the $k^{th}$ time instant) which is modeled as a Markov chain (see FIG. 20 for M=2) and updates the model selection probabilities using the likelihood values. The state estimate combiner combines the outputs of M filters and provides the final mixed state estimate.

The detailed steps for the localization engine with the mixture of M dynamics models are as follows. $p(i,j)$ is denoted as the forward probability, i.e., $p(i,j)=P(r_k=i|r_{k-1}=j)$, and $\mu_{mat}(i,j)$ as the backward probability, i.e., $\mu_{mat}(i,j)=P(r_{k-1}=j|r_k=i)$. Thus, by Bayes' rule, $\mu_{mat}(i,j)=P(r_{k-1}=j|r_k=i)=P(r_k=i|r_{k-1}=j)P(r_{k-1}=j)=p(i,j)\mu(j)$, where $\mu(j)=P(r_{k-1}=j)$ is the probability at which model j was selected at the previous time instant.

Detailed description of the main steps of EKF based mixture model for localization and tracking is described as follows as shown in TABLE 6.

TABLE 6

Main steps pf EKF based mixture model

Step 1: Mixing of State Estimates
  Initial state estimate for model j (j = 1, 2, ..., M):

$$X^{0j} = \Sigma_{i=1}^{M} X^i \mu_{mat}(i, j) \text{ where } \mu_{mat}(i, j) = \frac{p_{i,j}\mu(j)}{\sum_{i=1}^{M} p_{i,j}\mu(i)}.$$

Initial state covariance for model j:
  $P^{0j} = \Sigma_{i=1}^{M} \mu_{mat}(i, j) + P^i + (X^i - X^{0j})(X^i - X^{0j})^T$
Step 2: Model Update
  Use the EKF steps. For the $j^{th}$ model (j = 1, ..., M):
    $X^j = F^j X^{0j}$
    $P^j = F^j P^{0j} F^{j^T} + Q^j$
    $S^j = H^j P^j H^{j^T} + R$
    $K^j = P^j H^{j^T} S^{j^{-1}}$
    $\tilde{Z}^j = Z^j - H^j X^j$
    $X^j = X^j + K^j \tilde{Z}^j$
    $P^j = (I - K^j H^j) P^j$
Step 3: Model Likelihood Computation $$\Lambda(j) = \frac{1}{\sqrt{2\pi|S_k|}} \exp\left(-0.5\, \tilde{Z}^{j^T} S^{j^{-1}} \tilde{Z}^j\right)$$

$$\mu(j) = \frac{\Lambda(j)\sum_{i=1}^{M} p_{i,j}\mu(i)}{\sum_{i=1}^{M} \Lambda(j)\sum_{i=1}^{M} p_{i,j}\mu(i)}$$

TABLE 6-continued

Main steps pf EKF based mixture model

Step 4: Combine State Estimates
$X = \Sigma_{i=1}^{M} X^i \mu(i)$ $$P = \sum_{i=1}^{M} \mu(i)\left[P^i + (X^i - X)(X^i - X)^T\right]$$

Figure 21:
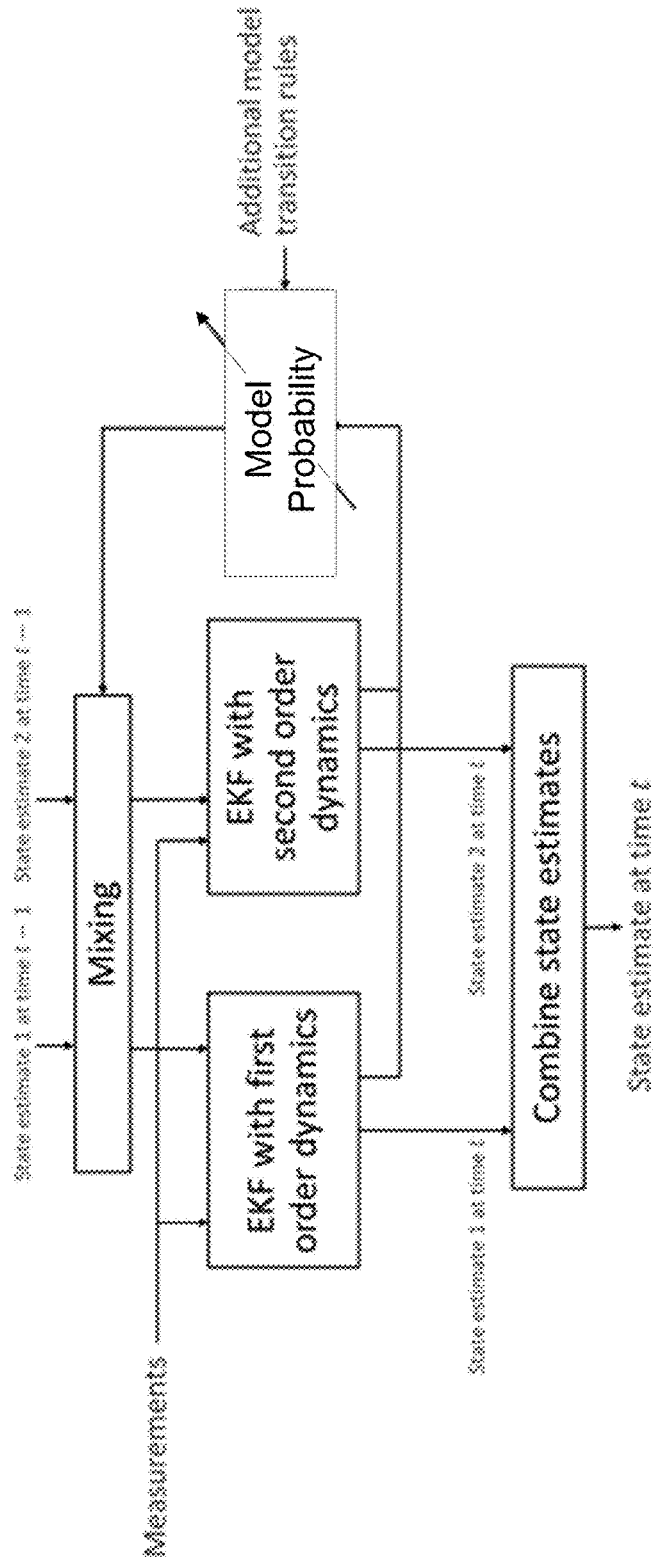
FIG. 21 illustrates an example mixture with two EKF models according to embodiments of the present disclosure.

The model transition probability p(i,j) can be updated or adapted based on other observations/measurements/information. This corresponds to one example of the additional inputs to the model probability update as shown in FIG. 21. In one example, the model transition probability update can depend on whether one or more measurement loss or partial measurement loss (e.g. range measurement between the tag and an anchor) has occurred. If there is no (partial) measurement loss, the model transition probability can be of one configuration; else if there is (partial) measurement loss, a model can be chosen or favored.

FIG. 21 illustrates an example mixture with two EKF models 2100 according to embodiments of the present disclosure. The embodiment of the mixture with two EKF models 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

FIG. 21 shows a special case of FIG. 19, corresponding to the case with two EKF models. In one example, the first order dynamics is chosen for EKF when there is a (partial) measurement loss; else the model transition probability remains the same. One particular example is as shown below.

$$p = \begin{bmatrix} 0.8 & 0.2 \\ 0.2 & 0.8 \end{bmatrix},$$

when there is no (partial) measurement loss; and $$p = \begin{bmatrix} 0 & 1 \\ 0 & 1 \end{bmatrix},$$

when there is (partial) measurement loss (i.e., first order dynamics are selected).

In the present disclosure, a localization system using wireless sensor network is provided where the sensors (anchors) measure the distances of the tag from the anchors (also known as ranges) and relay the measurements to the tag over wireless communication channel. As these measurements are subjected to sensing errors, the tag obtains an estimate of the true value of the physical quantity.

One way of increasing this estimation accuracy at the tag is to connect to more number of anchors (possibly all) in the network. However, this may not be a feasible or desirable option as the connection to more number of nodes increases the operation cost (e.g. scheduling overhead and other metrics). Thus, it is important to design an optimal/near-optimal strategy/algorithm that may enable the anchor selection to achieve a target accuracy under the minimum cost.

An application of this algorithm is the autonomous node selection (ANS) in indoor localization, where the ANS may decide the set of anchors with minimum connection cost which may ensure a target estimation accuracy.

The present disclosure relates to a new localized resource management method for localization using a wireless sensor network. Specifically, each sensor, alternatively referred to as anchor in the network is capable of measuring the distance of the target (also known as range measurements) and sending the range measurements to the target over wireless communication channels. Based on the estimated location based on the range measurements, the target uses the method to determine the anchors from which the target may actively collect measurements to achieve a certain target estimation accuracy.

In one embodiment, a localization system based on a wireless sensor network of anchors can been deployed to collect range measurements of a target. Each anchor in this network as well as the target can be enabled with a computer to process data and a two-way radio to share information, a battery to provide power. The range measurements can be sent by the anchors to the target by a wireless communication channel after some periodic/aperiodic time intervals. After the completion of one reporting cycle where all the active anchors have sent their most recent range measurements, a measurement report can be constructed at the target by concatenating all the measurements in one reporting cycle.

A tracking algorithm can run in the target's computer and collects the measurement reports to estimate the target's location with respect to a global coordinate system (GCS). Examples of the tracking algorithms are least-squares, and any Bayesian filtering methods (e.g., Kalman and extended Kalman filters). After time interval, known as the activity cycle, which may comprise of one or more reporting cycles, the target may decide to select a new set of active anchors within the communication range which may perform ranging. Each anchor can know the location with respect to the GCS. The target can acquire the locations of the anchors upon request at the beginning of the activation cycle. In the present disclosure, a resource management method is introduced which allows the target to select the set of active anchors for each activity cycle.

It is noted that the localization system as described is an example system where the method can be applicable. Other systems are also possible, where the anchor selection and/or tag location tracking can be performed by one or more of the anchors, or by a centralized control unit connected with the anchors, when the information as described in the disclosure to carry out the operation is available at the unit performing the operation.

Figure 22A:
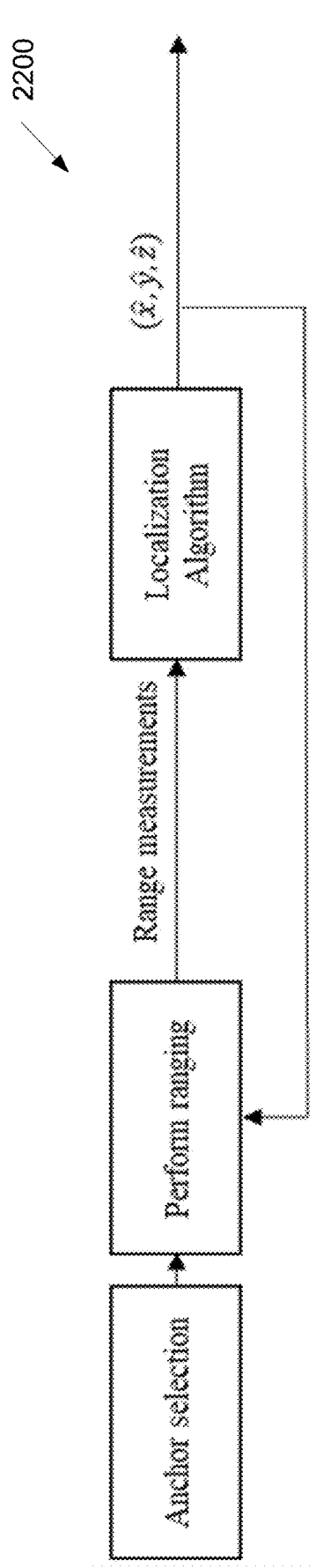
FIG. 22A illustrates an example static anchor selection according to embodiments of the present disclosure.

FIG. 22A illustrates an example static anchor selection 2200 according to embodiments of the present disclosure. The embodiment of the static anchor selection 2200 shown in FIG. 22A is for illustration only. One or more of the components illustrated in FIG. 22A can be implemented in specialized circuitry configured to perform the noted functions or one or more of the components can be implemented by one or more processors executing instructions to perform the noted functions.

The method in this embodiment can be used to determine the set of active anchors $\mathcal{N}_a$ from a set of candidate anchors $\mathcal{N}$ available in the network which satisfies a set of criteria/objectives. This method can be applied to a one-off (static) or semi-static anchor selection system as shown in FIG. 22A, where anchor selection is performed in the beginning of the ranging/localization session and may not be performed during the current ranging/localization session. It can also be applied to a more dynamic/adaptive anchor selection system as shown in FIG. 22B, where anchor selection (if assessed to be needed/desired) can be triggered for time interval similar to ranging or localization time interval.

Figure 22B:
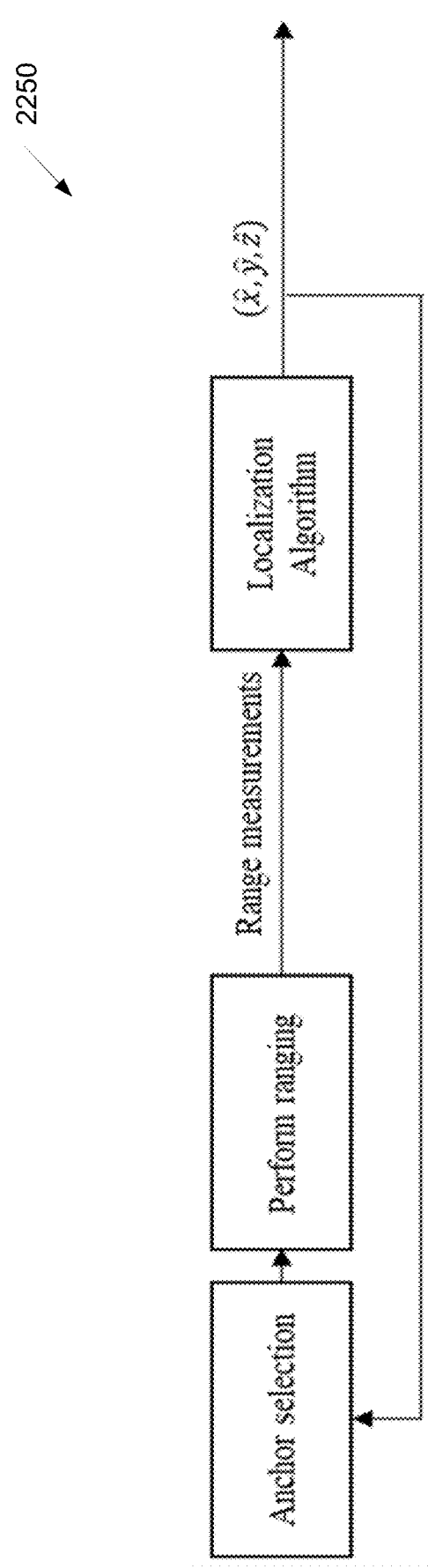
FIG. 22B illustrates an example dynamic anchor selection according to embodiments of the present disclosure.

FIG. 22B illustrates an example dynamic anchor selection 2250 according to embodiments of the present disclosure. The embodiment of the dynamic anchor selection 2250 shown in FIG. 22B is for illustration only. One or more of the components illustrated in FIG. 22B can be implemented in specialized circuitry configured to perform the noted functions or one or more of the components can be implemented by one or more processors executing instructions to perform the noted functions.

During the first measurement report of the activity cycle, the target acquires the locations from the candidate anchors in $\mathcal{N}$. The measurement reports in the activity cycle are prepared at discrete time steps $t=0, 1, \ldots, T$. The target has an estimate of the location as $\hat{x}_t$ which can be obtained by the location estimation computed at the previous time step (when $t>0$) or acquired from the latest estimated location available after the completion of the previous activity cycle. Using $\hat{x}_t$, the target computes the pseudo-range measurements from the candidate anchors in $\mathcal{N}$ as $\hat{d}_{0,i} = f(\hat{x}_t, x_{a_i}) = \|x - x_{a_i}\|$, where $\|\cdot\|$ denotes the Euclidean norm. Based on the pseudo-ranges, the target computes an estimate of the estimation error covariance at $t^{th}$ time instant as:

$$M(\mathcal{N}) = \left(J_{\hat{x}_t}^T Q^{-1} J_{\hat{x}_t}\right)^{-1} \quad (1)$$

where Q is the measurement error covariance and the Jacobian matrix is given by:

$$J_{\hat{x}_t} = \begin{bmatrix} \frac{(\hat{x}_t - x_{a_1})}{\|x - x_{a_1}\|} & \frac{(\hat{y}_t - y_{a_1})}{\|x - x_{a_1}\|} & \frac{(\hat{z}_t - z_{a_1})}{\|x - x_{a_1}\|} \\ \frac{(\hat{x}_t - x_{a_2})}{\|x - x_{a_2}\|} & \frac{(\hat{y}_t - y_{a_2})}{\|x - x_{a_2}\|} & \frac{(\hat{z}_t - z_{a_2})}{\|x - x_{a_2}\|} \\ \vdots & \vdots & \vdots \\ \frac{(\hat{x}_t - x_{a_{|N|}})}{\|x - x_{a_{|N|}}\|} & \frac{(\hat{y}_t - y_{a_{|N|}})}{\|x - x_{a_{|N|}}\|} & \frac{(\hat{z}_t - z_{a_{|N|}})}{\|x - x_{a_{|N|}}\|} \end{bmatrix}. \quad (2)$$

The metric of interest can be a scalar function of $M(\mathcal{N})$, denoted as $\phi(M(\mathcal{N}))$. A low $\phi(M(\mathcal{N}))$ value implies better localization performance. An example of the metric of interest is the estimated geometric dilution of precision (GDOP).

$$GDOP_{\hat{x}_t} = (Tr(M(\mathcal{N})))^{\frac{1}{2}}. \quad (3)$$

$\phi$ is formulated as the following mapping: $\phi: 2^{\mathcal{N}} \mapsto \mathbb{R}$, where $2^{\mathcal{N}}$ denotes the power-set of $\mathcal{N}$ and $$\phi(\mathcal{N}) := \phi(M(\mathcal{N})) = \phi\left(\left(J_{\hat{x}_t}^T(\mathcal{N}) Q^{-1}(\mathcal{N}) J_{\hat{x}_t}^T(\mathcal{N})\right)^{-1}\right) \quad (4)$$

In equation (4)

$$J_{\hat{x}_t}$$

($\mathcal{N}$) is constructed by stacking the rows indexed by N from $$J_{\hat{x}_t}$$

defined in equation (2). Anchor selection can be defined as the execution of the following operation at each time step t: given $\hat{x}_t$, $$\mathcal{N}_a := \arg\min_{N \subseteq \mathcal{N}} c(N) \text{ such that } \phi(N) < \phi_0 \quad (5)$$

In equation (5), c(N) is a cost function associated with the subset N and $\phi_0$ is a pre-determined estimation accuracy threshold. An example cost function can just be the number of anchors to be selected. If the estimation accuracy cannot be satisfied, anchor selection can indicate selection of all candidate anchors or can indicate infeasible outcome. The algorithm to execute equation (5) can be done with steps below as shown in TABLE 7.

TABLE 7

Anchor selection

Algorithm 1: Anchor Selection

1: Input: Candidate anchor locations $\mathcal{N}$, and location estimate of the tag, $\hat{x}_t$
2: Output: Set of active anchors for time t: $\mathcal{N}_a$
3: Compute $\phi(\mathcal{N})$
4: N ← ∅
5: while $\phi(N) \geq \phi_0$ do 6: $N \leftarrow N \cup \left\{\arg\min_{i \in N \setminus N} \phi(i|N)\right\}$ 7: $\mathcal{N}_a = N$ The anchor selection procedure can be triggered when the estimation accuracy of the current set of anchors is worse than a certain threshold $\phi_{th}$. This can occur due to the movement of the tag, or in case of mobile/portable anchors, movement of one or more anchors. $\phi_{th}$ can be the same as $\phi_0$, or $\phi_{th}$ can include a hysteresis margin with respect to $\phi_0$, such that $\phi_{th} > \phi_0$.

Figure 23:
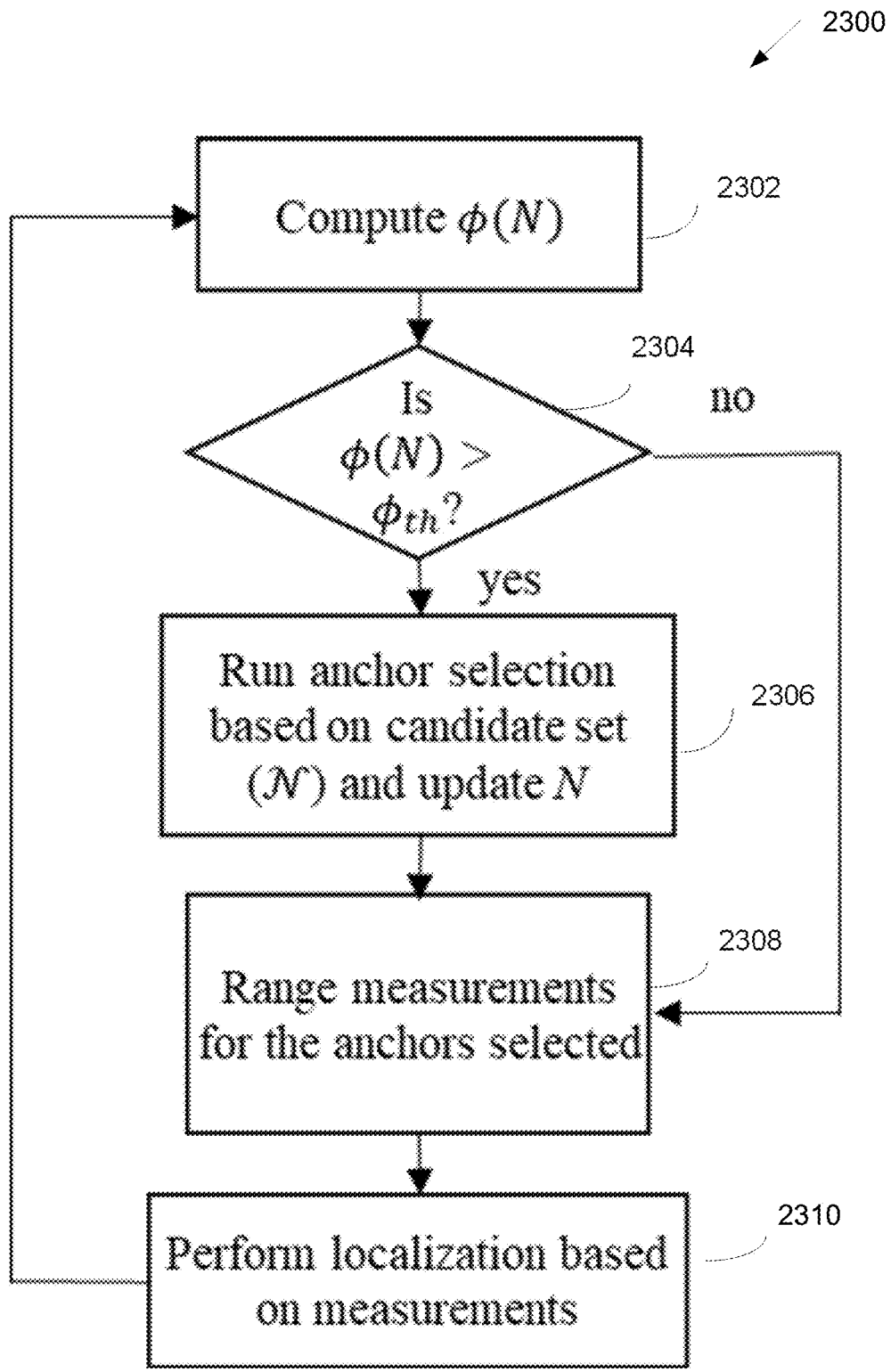
FIG. 23 illustrates an example adaptive anchor selection process according to embodiments of the present disclosure.

FIG. 23 illustrates an example adaptive anchor selection process 2300 according to embodiments of the present disclosure. The embodiment of the adaptive anchor selection process 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

An example procedure of adaptive anchor selection is shown in FIG. 23. The metric for estimation accuracy $\phi(N)$ is calculated in step 2302 based on the current set of active anchors and the current estimate of the tag location (which can be obtained from previous tag localization result). If accuracy is estimated to become worse than a threshold $\phi_{th}$ in step 2304, the anchor selection procedure is triggered in step 2308, else the current set of active anchors can be retained for subsequent ranging and localization. If the anchor selection procedure is triggered, the current set of active anchors for ranging is updated with the new set generated by the anchor selection in step 2306. The next round of ranging measurement and localization are then performed with the new set of active anchors in step 2310. The localization results as well as the anchors selected are used to compute the next $\phi(N)$ for the next round of adaptation.

Figure 24:
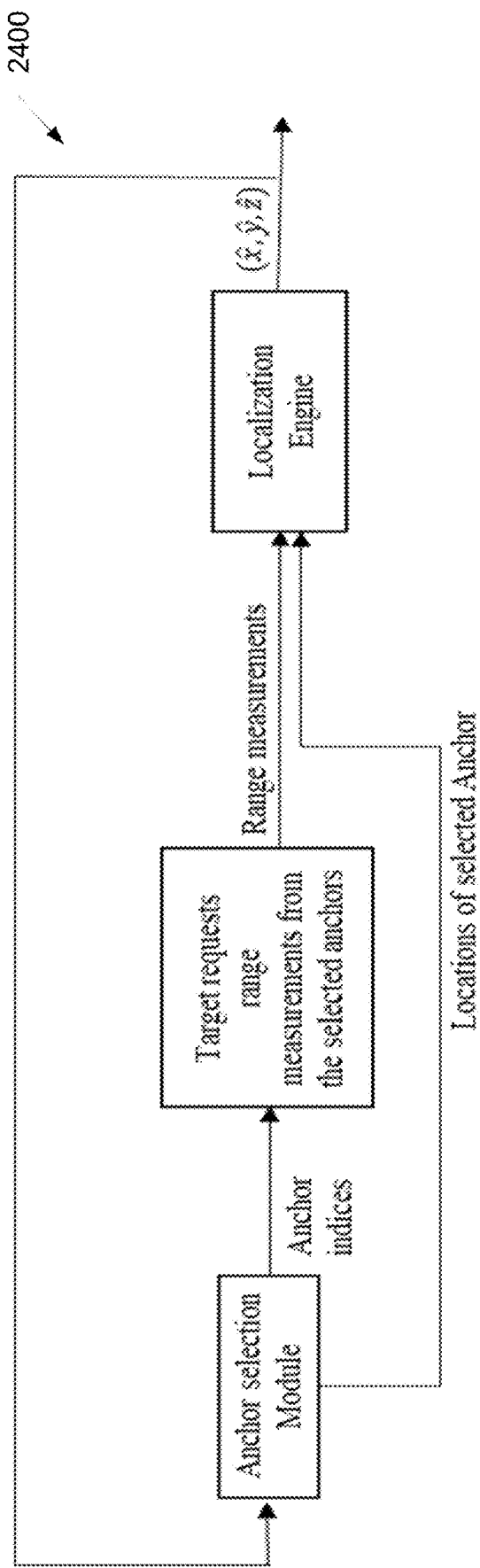
FIG. 24 illustrates an example adaptive anchor selection system according to embodiments of the present disclosure.

FIG. 24 illustrates an example adaptive anchor selection system 2400 according to embodiments of the present disclosure. The embodiment of the adaptive anchor selection system 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

In one embodiment, the construction of the set of active anchors for one activity cycle can be divided into two stages as follows.

In one example global anchor selection (GAS)/exploration stage, an algorithm in this stage picks up a set of nodes $\mathcal{N} \subseteq \mathcal{N}_G$ based on some quality metric (e.g., received signal strength).

In one example of local anchor selection (LAS)/exploitation stage, after $\mathcal{N}$ is fixed, for each activity cycle, the LAS chooses $\mathcal{N}_a \subseteq \mathcal{N}$.

Figure 25:
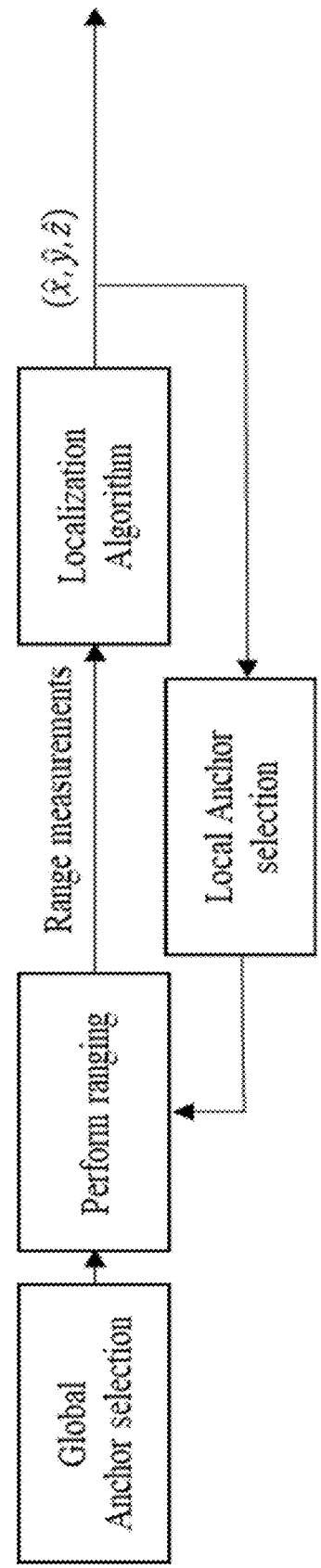
FIG. 25 illustrates an example global and local anchor selection according to embodiments of the present disclosure.

FIG. 25 illustrates an example global and local anchor selection 2500 according to embodiments of the present disclosure. The embodiment of the global and local anchor selection 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions.

The two-stage process is as shown FIG. 25. Note that for LAS, the target needs to acquire the location information of all the $\mathcal{N}$ anchors through signaling with the sensor network. Thus, GAS can be used to reduce this signaling overhead at the beginning of each activity cycle. The algorithm for LAS can be performed with the steps below as shown in TABLE 8.

TABLE 8

Local anchor selection

Algorithm 2 Local anchor selection

1: Input: Anchor locations selected by the GNS: $\{X_{ai}, i \in \mathcal{N}\}$, location estimate $\hat{x}_t$
2: Output: Set of active anchors for time t: $\mathcal{N}_a$
3: Compute $\phi(\mathcal{N})$
4: $N \leftarrow \emptyset$
5: while $\phi(N) \geq \phi_0$ do 6: $N \leftarrow N \cup \left\{\arg\min_{i \in \mathcal{N} \setminus N} \phi(i|N)\right\}$ 7: $\mathcal{N}_a = N$ In another embodiment, the cost function as shown in equation (5) can be the energy expended in various parts of the localization process. There can be three components of energy consumption in a localization framework.

In one example, energy expended for ranging initiation ($E_{init}$) is provided.

In another example, energy consumed for message passing ($E_{msg}$) is provided. In a tag-controlled localization framework, there are various message-passing operations, each of which expends an energy of $E_{msg}$ Watts.

In yet another example, energy spent for computations and signal processing ($E_{SP}$) in the ranging/localization unit of the tag is provide.

Figure 26:
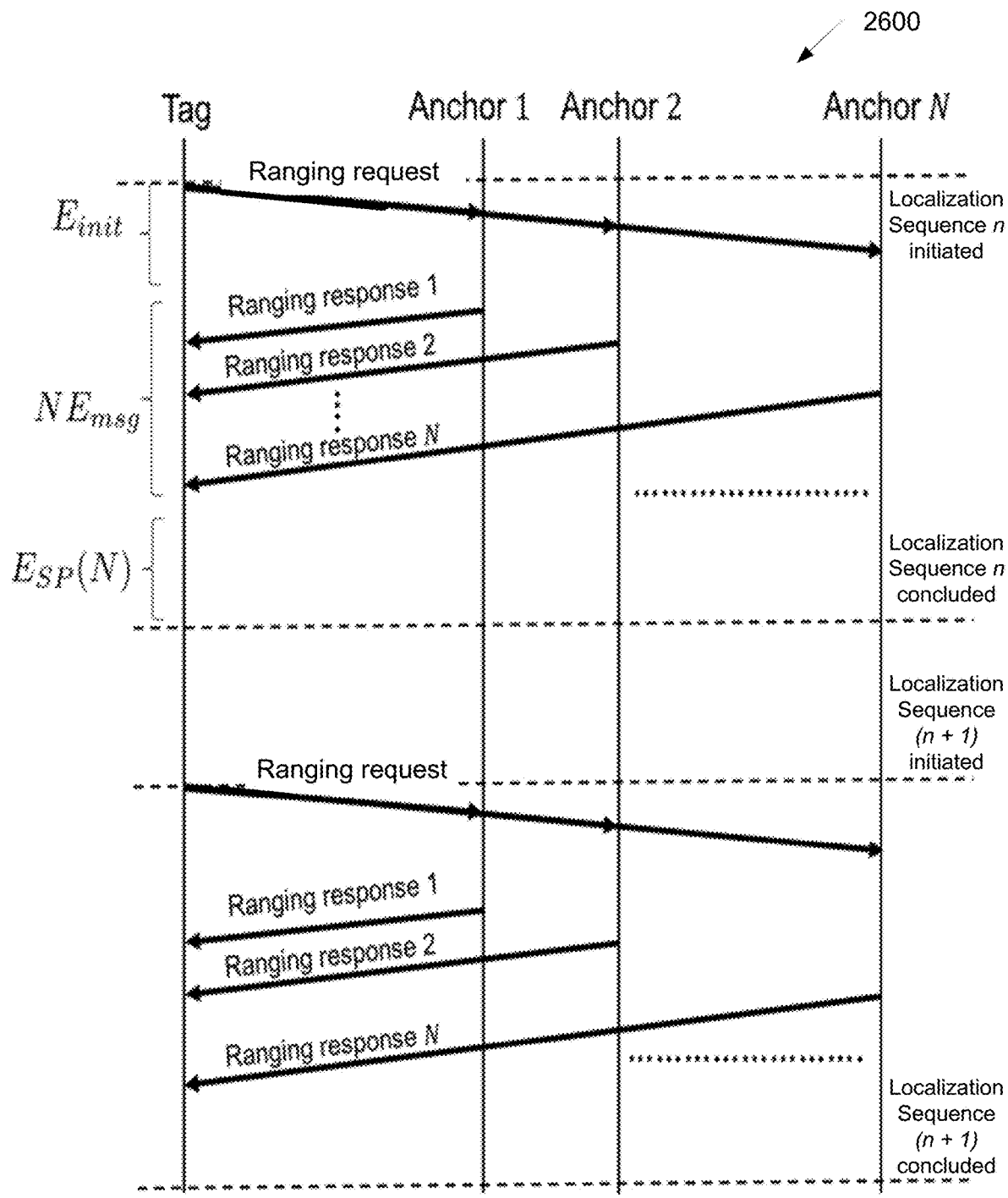
FIG. 26 illustrates an example schematic of localization sequence and energy consumption model per ranging interval according to embodiments of the present disclosure.

FIG. 26 illustrates an example schematic of localization sequence and energy consumption model per ranging interval 2600 according to embodiments of the present disclosure. The embodiment of the schematic of localization sequence and energy consumption model per ranging interval 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

FIG. 26 shows an example localization procedure initiated by a tag (of unknown location), trying to locate itself using ranging measurements with N anchors (of known location). The energy spent to transmit the ranging requests ($E_{init}$) is independent of the number of anchors. Receiving the ranging responses with the ranging data from each anchor consumes an energy of $E_{msg}$ per response. Finally, localization using trilateration/tracking-based algorithms consume an energy $E_{SP}(N)$, which is dependent on the number of anchors. Therefore, the total energy consumed ($E_{total}$) per ranging interval is $E_{total} = E_{init} + NE_{msg} + E_{SP}(N)$.

In another embodiment, the anchor selection can take into account the desirable/required localization format/metrics, such as the localization dimensions. An example localization format/metric is 2D or 3D localization result, and more specifically (X, Y), or (X, Z), or, (Y, Z), or (X, Y, Z) localization. This is because the number of anchors as well as the metric $\phi(N)$ depends on the localization format/metric. The desired/required localization format/metric can change depending on various factors. One factor is the current condition of the tag, such as the position of the tag within the localization region of interest.

Figure 27:
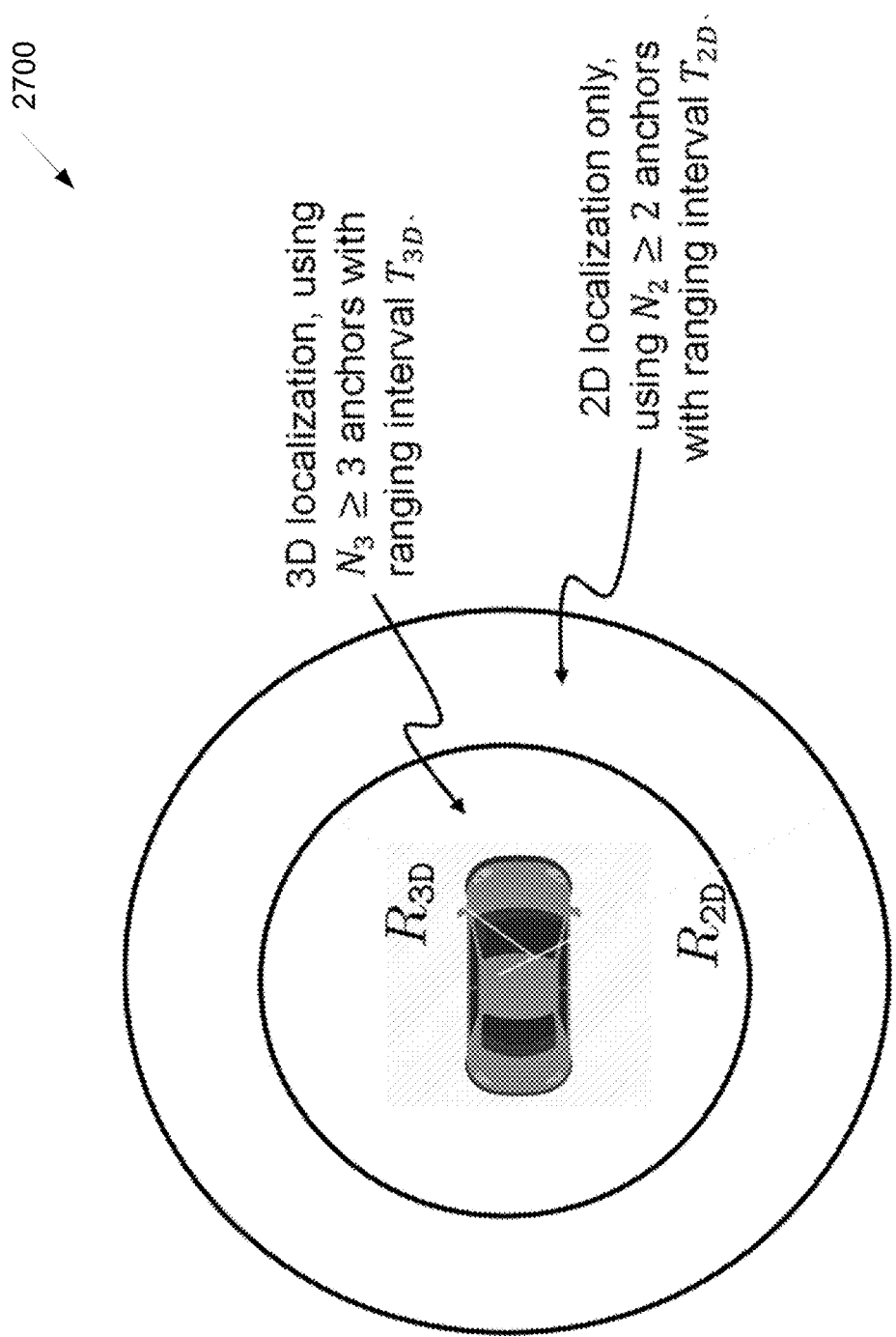
FIG. 27 illustrates an example transition between localization modes based on range according to embodiments of the present disclosure.

FIG. 27 illustrates an example transition between localization modes 2700 based on range according to embodiments of the present disclosure. The embodiment of the transition between localization modes 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions.

An example of how the number of anchors desired/required can change is shown in FIG. 27 for a car access use case where the localization mode (i.e., 2D or 3D localization) and hence the number of anchors required changes with respect to the range of the tag from the car. An example procedure to determine the range thresholds/boundaries to change localization mode is provided in FIG. 28.

Figure 28:
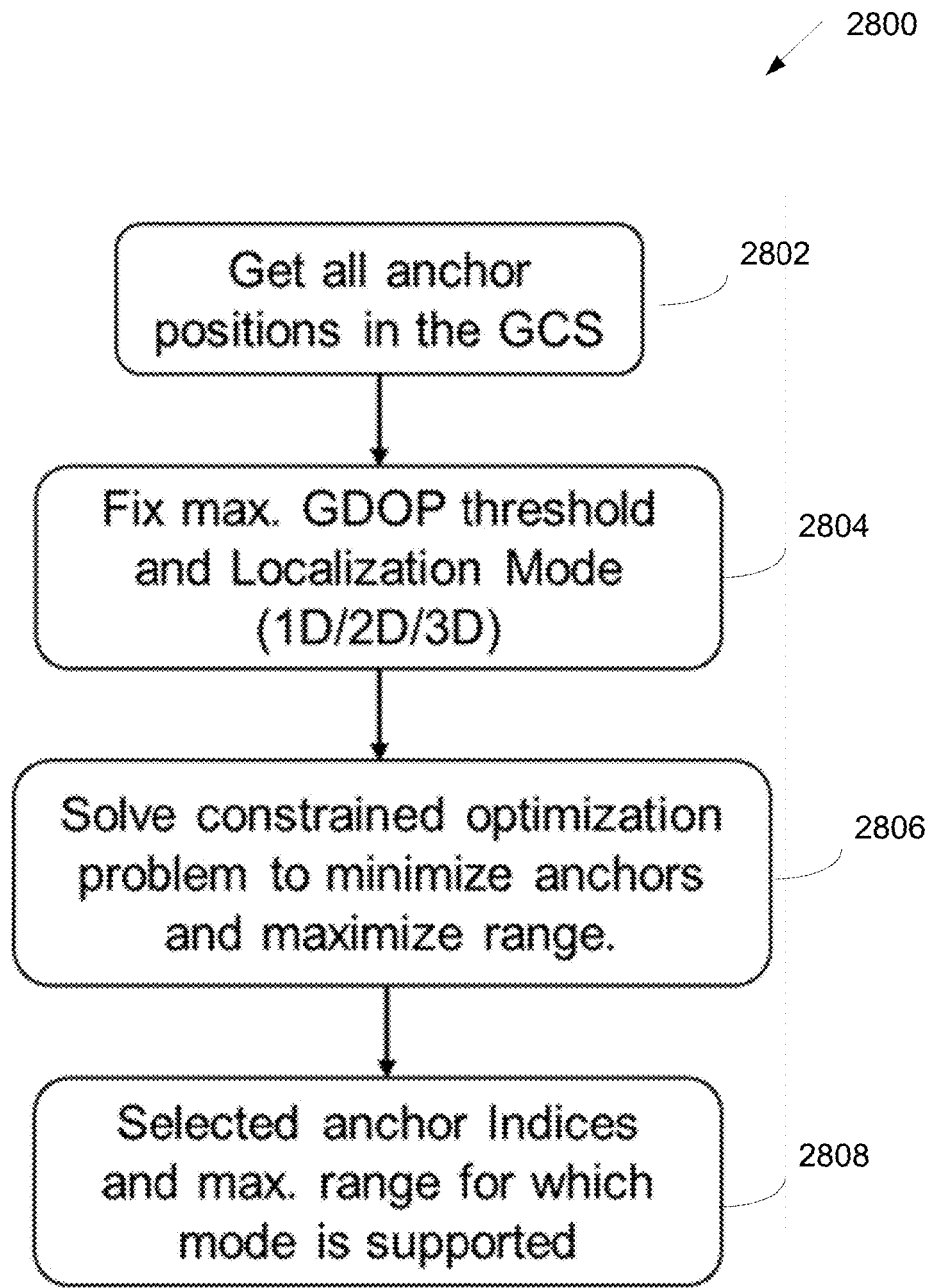
FIG. 28 illustrates a flow chart of a method for determining range thresholds to change the localization mode according to embodiments of the present disclosure.

FIG. 28 illustrates a flow chart of a method 2800 for determining range thresholds to change the localization mode according to embodiments of the present disclosure. The embodiment of the method 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions.

As illustrated in FIG. 28, the method 2800 comprises in step 2802 getting all anchor positions in the GCS, fixing in step 2804 maximum GDOP threshold and localization mode (1D/2D/3D), solving in step 2806 constrained optimization problem to minimize anchors and maximize range, and identifying in step 2810 selected anchor indices and maximum range for which mode is supported.

Localization result can be generated or calculated for each time instance where the range measurements from the anchors are available. The quality of measurements including range, angle-of-arrival (AOA) can have impact on the localization accuracy. Therefore, solutions to enable the localization engine/system to take into account the quality of measurements can be beneficial.

The time of flight (ToF) based range measurements and angle of arrival (AoA) measurements are prone to measurement errors. These errors arise due to various reasons including but not limited to environmental factors, device limitations, interference, signal power, etc. Localization of a "tag" device (other names are not precluded) requires range and/or AoA measurements from multiple anchors. Given the anchor locations and sufficient number of range and/or AoA measurements, the location of the device can be obtained after performing some computations. Erroneous range and AoA measurements result in erroneous localization.

Devices that measure ranges and AoA also may report the confidence of the measured range and AoA. The confidence of the measured range or AoA can be reported many forms or metrics including but not limited to whether the signal path is line of sight (LoS), received signal strength (RSS), RSS Indicator, peak value of correlation of a known codeword such as a preamble, one or more values of the channel impulse response (CIR), CIR with timing information, a statistical measure of CIR among others.

Figure 29:
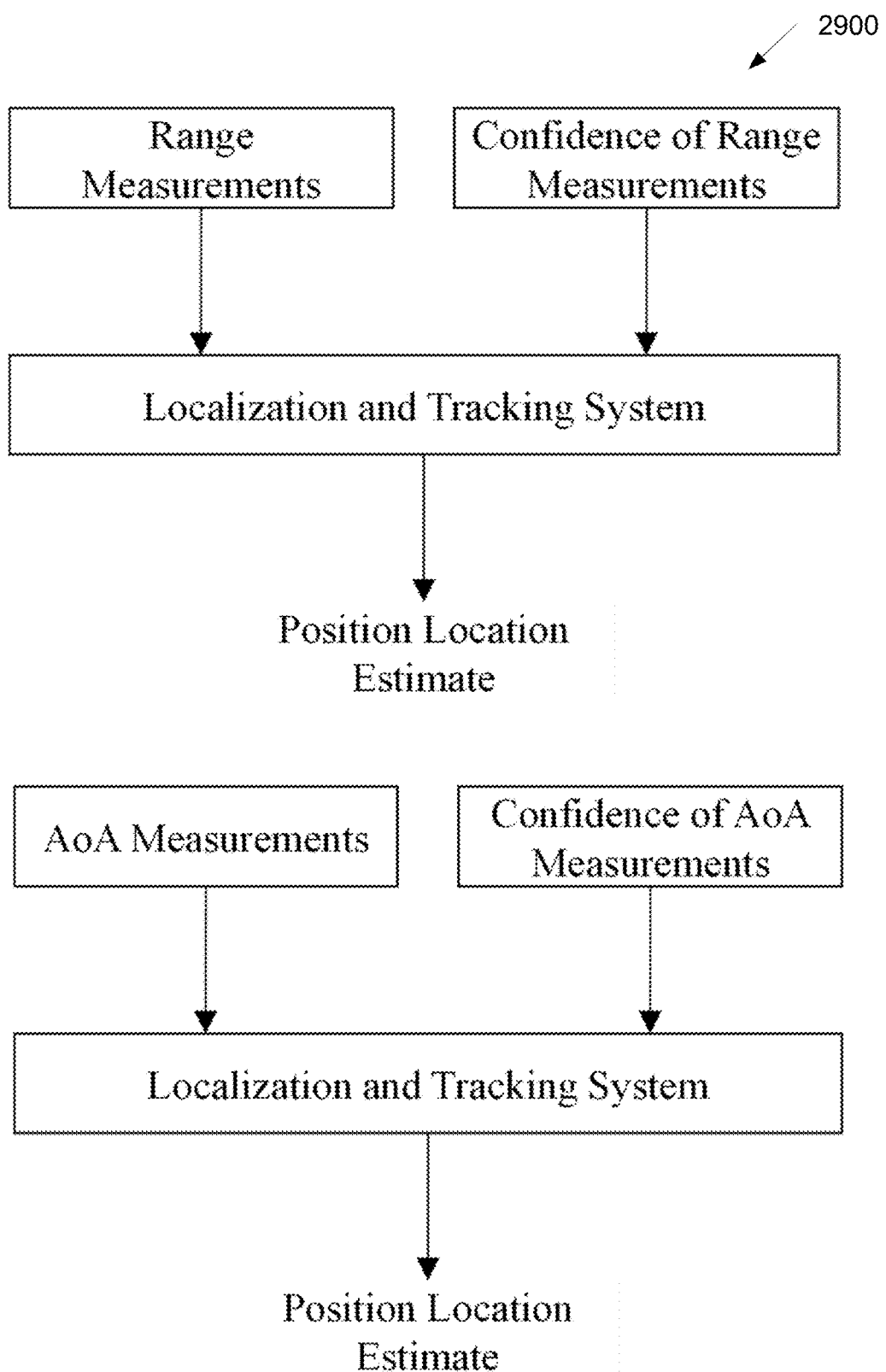
FIG. 29 illustrates an example incorporating confidence of range and AoA measurements in localization and tracking system according to embodiments of the present disclosure.

FIG. 29 illustrates an example incorporating confidence of range and AoA measurements 2900 in localization and tracking system according to embodiments of the present disclosure. The embodiment of the incorporating confidence of range and AoA measurements 2900 shown in FIG. 29 is for illustration only. One or more of the components illustrated in FIG. 29 can be implemented in specialized circuitry configured to perform the noted functions or one or more of the components can be implemented by one or more processors executing instructions to perform the noted functions.

These metrics can be used to improve the location estimates of the devise to be localized as shown in FIG. 29. The localization and tracking system can be tuned based on the metrics that indicate the confidence of range and/or AoA measurements to improve the accuracy. The confidence of these measurements can be used to modify the parameters of localization and tracking system in many ways including but not limited to tuning the statistical error variance of one of more range measurements, discarding one or more range/AoA measurements, weighting the range/AoA measurements before inputting to the localization system, etc.

The present disclosure describes methods to take into account measurement quality and/or measurement loss in generating localization result.

In one embodiment, the figure of merit (FoM) or the confidence of range and AoA measurements can be indicated. The confidence of range measurement or AoA measurements (e.g., figure of merit) conveys a quantification of the accuracy of range or angle measurements. The term FoM is used to refer to this quantification of accuracy of range and/or angle measurements. Other terms conveying the same are not precluded.

In one embodiment (S1), peak value of the channel impulse response is provided.

The FoM can be reported as the peak value of the CIR. CIR may be obtained after correlating the received signal with a local copy of the same signal for a certain predefined duration. The resulting peak may be used to indicate the confidence in the range measurement, or the figure of merit, denoted as FoM in decibel (dB) scale. If there are N range measurements available for localization at time step k, the figure of merit (FoM), denoted by $$\rho^i = 10^{FoM^i/10}$$

for sensor (or anchor or beacon, other terms not precluded) i, $1 \leq i \leq N$. Weighting can be obtained in many ways including but not limited to the following.

Figure 30:
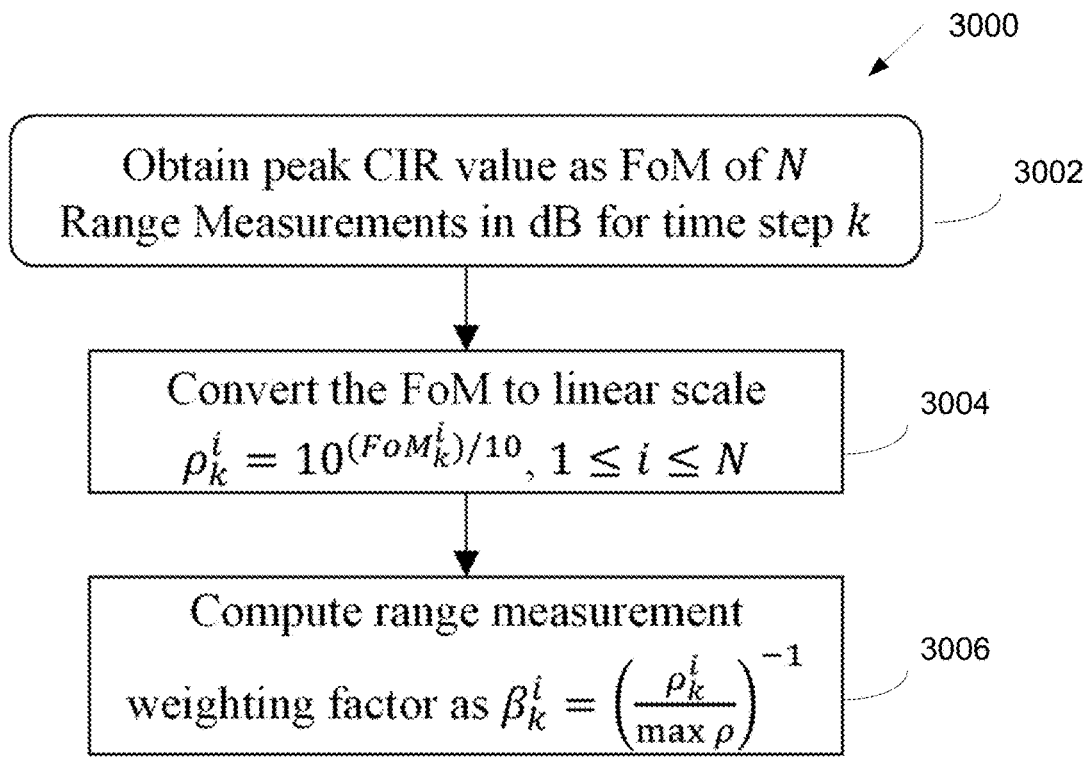
FIG. 30 illustrates a flow chart of a method for obtaining the weighting factor from FoM indicated by CIR peak by normalizing with the maximum value according to embodiments of the present disclosure.

In one example of normalizing with the maximum value, FoM may be normalized with the maximum value across all sensors as shown in FIG. 30 and max $\rho\rho$ can be determined based the methods: the max $\rho$ is the maximum value of FoM across all sensors until time step k; and the max $\rho$ is the maximum value of FoM across all sensors only at step k.

FIG. 30 illustrates a flowchart of a method 3000 for obtaining the weighting factor from FoM indicated by CIR peak by normalizing with the maximum value according to embodiments of the present disclosure. The embodiment of the steps to obtain the method 3000 shown in FIG. 30 is for illustration only. One or more of the components illustrated in FIG. 30 can be implemented in specialized circuitry configured to perform the noted functions or one or more of the components can be implemented by one or more processors executing instructions to perform the noted functions.

As illustrated in FIG. 30, the method 3000 comprises: obtaining in step 3002 peak CIR value as FoM of N range measurements in dB for time step k; converting in step 3004 the FoM to linear scale; and computing in step 3006 range measurement weighting factor.

Figure 31:
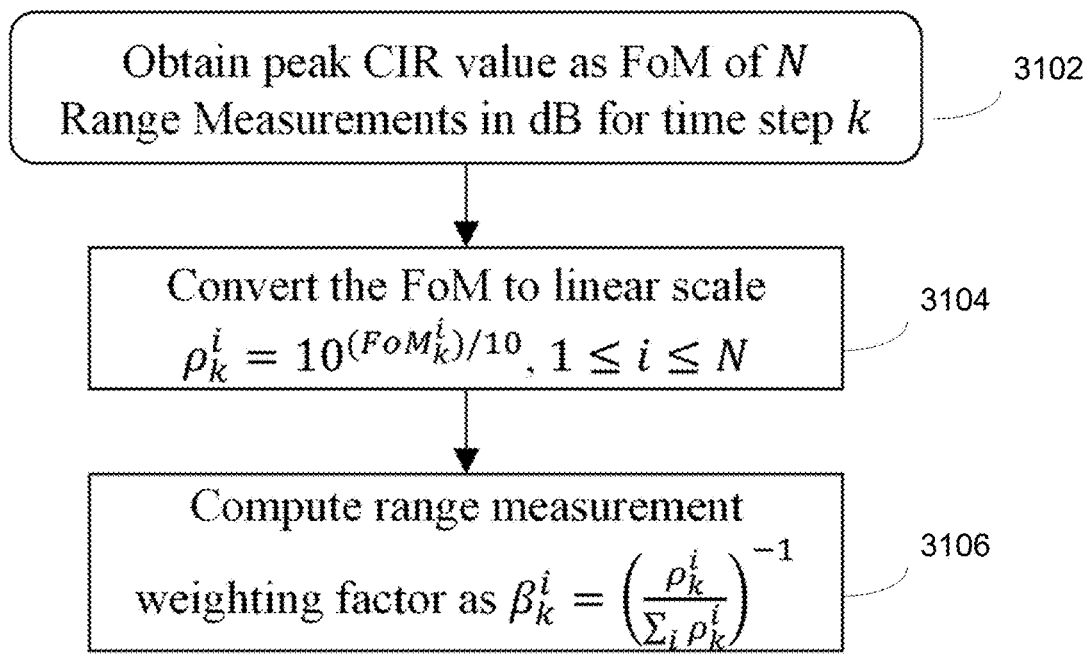
FIG. 31 illustrates a flow chart of a method for obtaining the weighting factor from FoM indicated by CIR peak by weighted average of a function of FoM according to embodiments of the present disclosure.

FIG. 31 illustrates an example of a method 3100 to obtain the weighting factor from FoM indicated by CIR peak by weighted average of a function of FoM according to embodiments of the present disclosure. The embodiment of the method 3100 to obtain the weighting factor shown in FIG. 31 is for illustration only. One or more of the components illustrated in FIG. 31 can be implemented in specialized circuitry configured to perform the noted functions or one or more of the components can be implemented by one or more processors executing instructions to perform the noted functions.

Weighted average of FoM values can be used as shown in FIG. 31. As illustrated in FIG. 31, the method 3100 comprises: obtaining in step 3102 peak CIR value as FoM of N range measurements in dB for time step k; converting in step 3104 the FoM to linear scale; and computing in step 3106 range measurement weighting factor.

Figure 32:
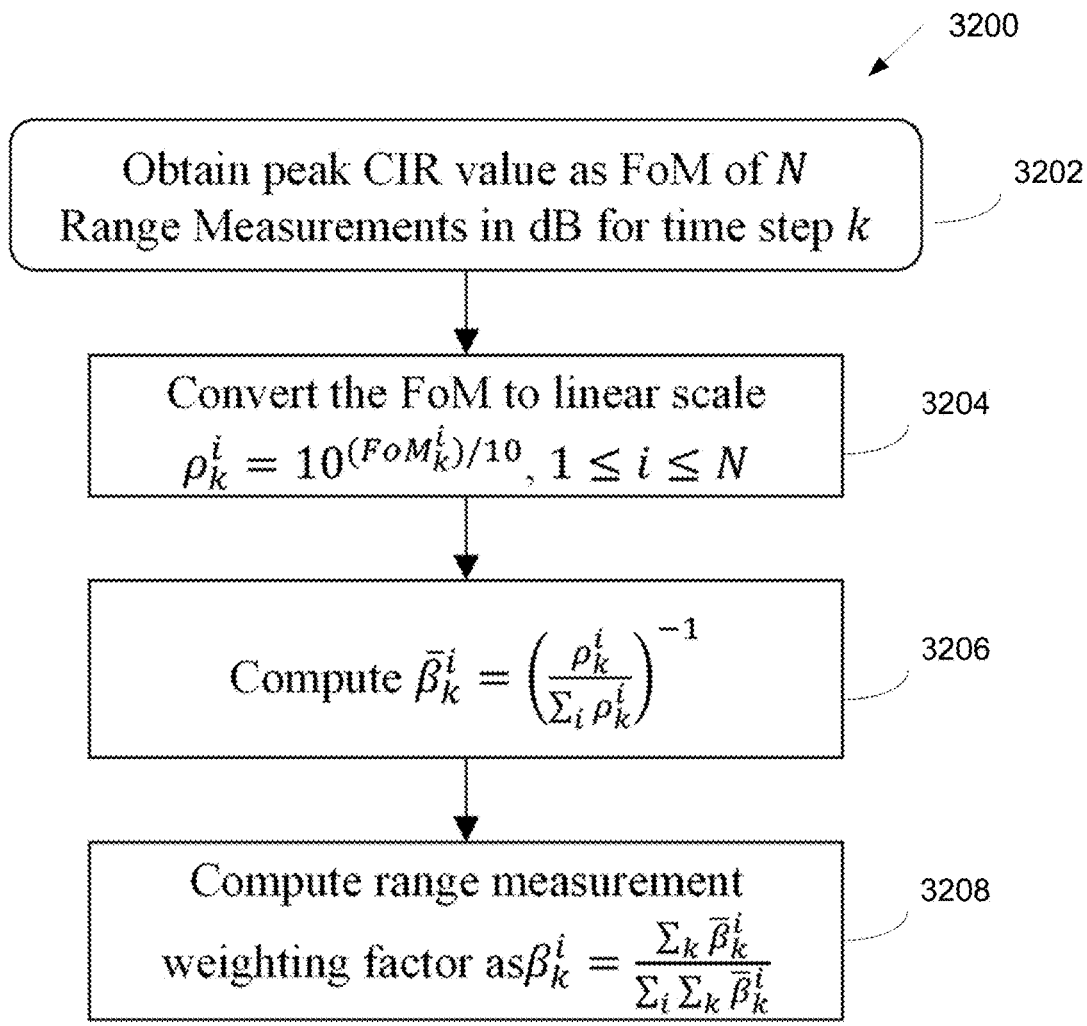
FIG. 32 illustrates a flow chart of a method for obtaining the weighting factor from FoM indicated by CIR peak by weighted average with memory according to embodiments of the present disclosure.

FIG. 32 illustrates a flowchart of a method 3200 for obtaining the weighting factor from FoM indicated by CIR peak by weighted average with memory according to embodiments of the present disclosure. The embodiment of the method 3200 to obtain the weighting factor shown in FIG. 32 is for illustration only. One or more of the components illustrated in FIG. 32 can be implemented in specialized circuitry configured to perform the noted functions or one or more of the components can be implemented by one or more processors executing instructions to perform the noted functions.

Weighted average with memory, assuming successive range measurement quality and hence FoM from each anchors or sensors or beacons are correlated, is illustrated in FIG. 32. As illustrated in FIG. 32, the method 3200 comprises: obtaining in step 3202 peak CIR value as FoM of N range measurements in dB for time step k; converting in step 3204 the FoM to linear scale; computing in step 3206; and computing in step 3208 range measurement weighting factor.

In one embodiment (S2), first peak and highest peak value of the channel impulse response is provided.

Figure 33:
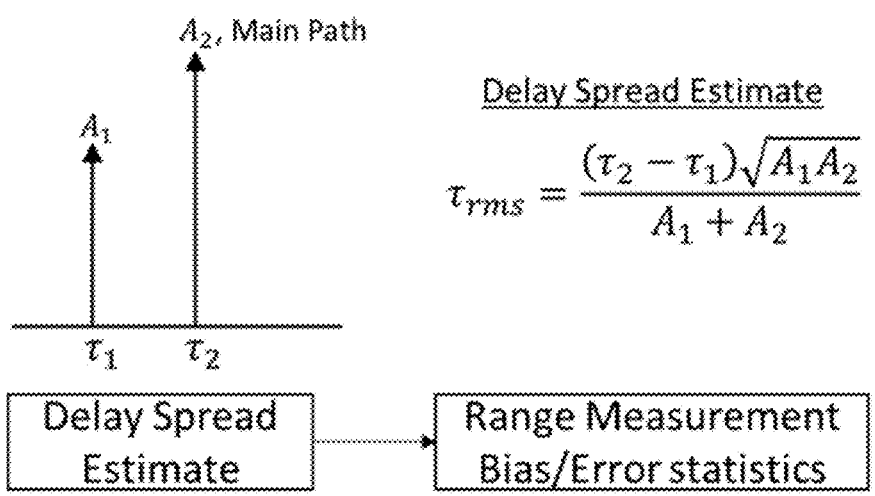
FIG. 33 illustrates an example computing delay spread estimate with FoM of first peak and highest peak according to embodiments of the present disclosure.

FIG. 33 illustrates an example computing delay spread estimate 3300 with FoM of first peak and highest peak according to embodiments of the present disclosure. The embodiment of the computing delay spread estimate 3300 shown in FIG. 33 is for illustration only. One or more of the components illustrated in FIG. 33 can be implemented in specialized circuitry configured to perform the noted functions or one or more of the components can be implemented by one or more processors executing instructions to perform the noted functions.

FoM of the first path, FoM of the main path (highest peak) and the taps/difference between the two (and the resolution of the taps) may help in getting a coarse estimate of channel delay spread. Consider FIG. 33, which shows the computation of delay spread estimate with the FoM of first peak and highest peak of the channel impulse response.

The delay spread estimate could be directly used to obtain range measurement bias or error statistics. One way to obtain this is by approximating the range measurement bias as an exponential distribution whose parameter is the computed the delay spread estimate or a function of the delay spread estimate. This is used to obtain a weighting factor for the range measurement error.

In one embodiment (S3), channel impulse response as FoM is provided. The channel impulse response (CIR) can be used to get an estimate of the delay spread. Delay spread is obtained from the channel power delay profile, $A_c(\tau)$ (or CIR) as $$\tau_{rms} = \sqrt{\frac{\int_0^\infty (\tau - \bar{\tau})^2 A_c(\tau) d\tau}{\int_0^\infty A_c(\tau) d\tau}} \text{ where, } \bar{\tau} = \frac{\int_0^\infty \tau A_c(\tau) d\tau}{\int_0^\infty A_c(\tau) d\tau}.$$

Figure 34:
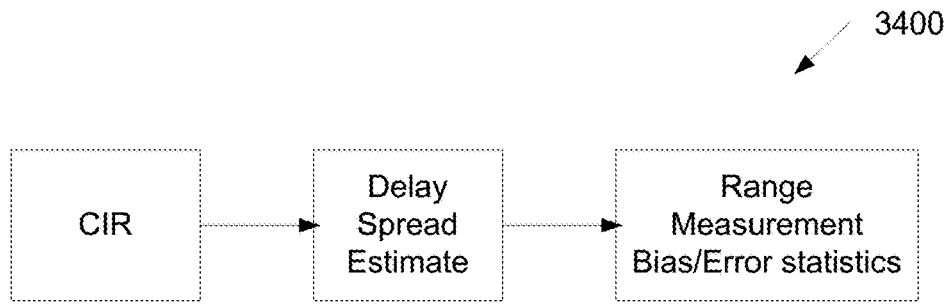
FIG. 34 illustrates an example obtaining range measurement bias or error statistics using CIR according to embodiments of the present disclosure.

FIG. 34 illustrates an example obtaining range measurement bias or error statistics using CIR 3400 according to embodiments of the present disclosure. The embodiment of the obtaining range measurement bias or error statistics using CIR 3400 shown in FIG. 34 is for illustration only. One or more of the components illustrated in FIG. 34 can be implemented in specialized circuitry configured to perform the noted functions or one or more of the components can be implemented by one or more processors executing instructions to perform the noted functions.

Delay spread can be used to classify LOS and NLOS measurements. The delay spread estimate could be directly used to obtain range measurement bias or error statistics. One way to obtain this is by approximating the range measurement bias as an exponential distribution whose parameter is the computed with the delay spread estimate or a function of the delay spread estimate. This is used to obtain a weighting factor for the range measurement error as shown in FIG. 34.

Other test statistics like kurtosis or skewness of the CIR may be used to infer if the measurement channel is LOS or NLOS. These test statistics are used to map CIR to FoM.

In one embodiment (S4), received signal strength measurements are provided.

Received signal strength measurement can be used as FoM to obtain an estimate of the signal-to-noise ratio (SNR), for a given receiver noise floor. This SNR is then used to compute the variance of the range estimate, which is also the variance of the range measurement error, using the formulation, $$\sqrt{\text{Var}(\hat{d})} = \frac{c}{2\sqrt{2}\pi\sqrt{SNR}B}$$

where c is the speed of light and B is the signal bandwidth. This is used as a weighting factor or can directly be used as an estimate for the range measurement error.

In one embodiment (S5), mapping FoM to variance of error measurement is provided.

Figure 35:
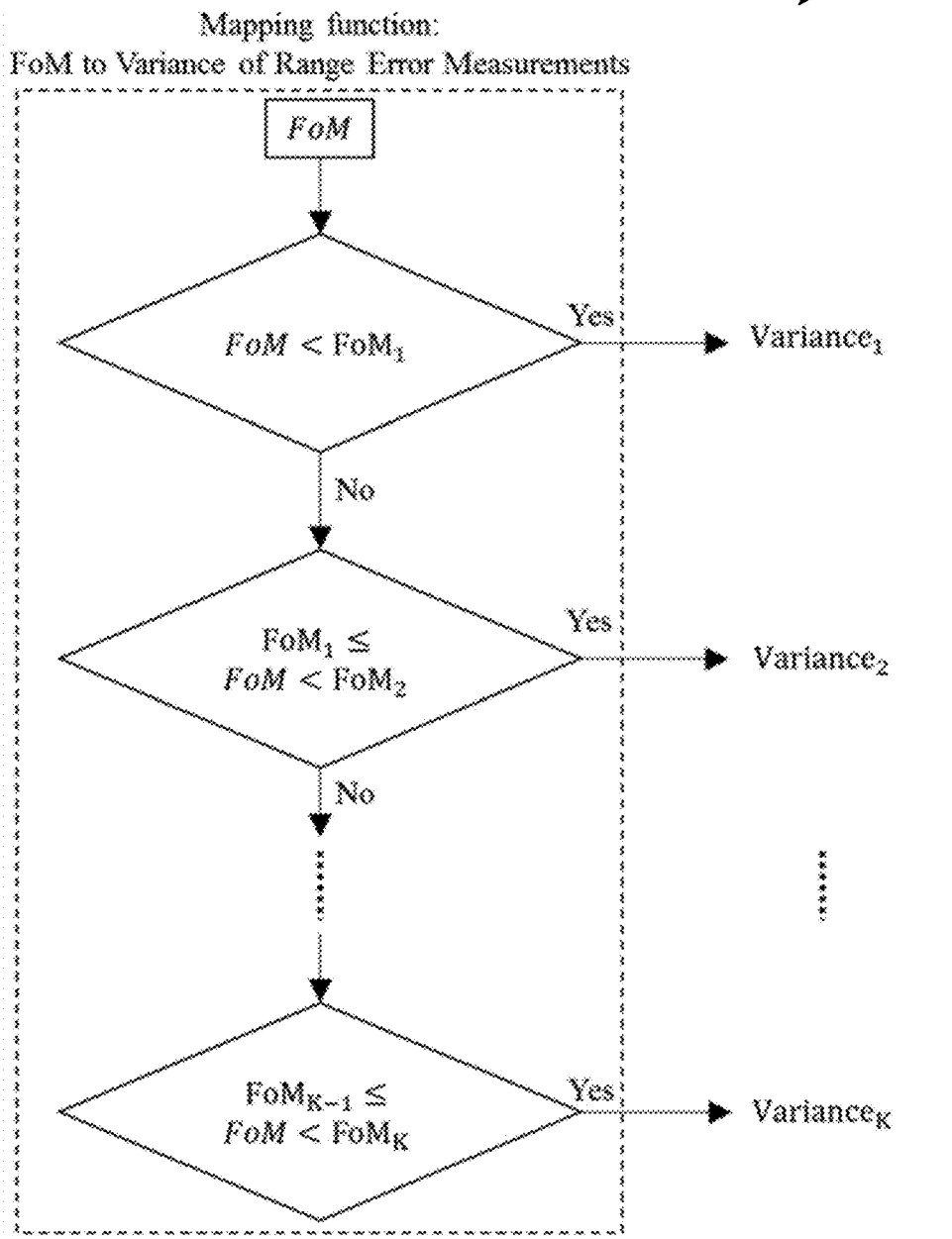
FIG. 35 illustrates an example mapping function between FoM and variance of range measurement errors according to embodiments of the present disclosure.

FIG. 35 illustrates an example mapping function between FoM and variance of range measurement errors 3500 according to embodiments of the present disclosure. The embodiment of the mapping function between FoM and variance of range measurement errors 3500 shown in FIG. 35 is for illustration only. One or more of the components illustrated in FIG. 35 can be implemented in specialized circuitry configured to perform the noted functions or one or more of the components can be implemented by one or more processors executing instructions to perform the noted functions.

FoM or a function of FoM obtained via any scheme can be mapped to a discrete set of variance of range measurement errors using a mapping function. An example of a mapping is shown in FIG. 35. This mapping is further used to generate the weighting factor for range measurements to be used in localization and tracking system.

In one embodiment, localization and tracking using confidence of range measurements (or figure of merit) is provided.

The extended Kalman filter (EKF) state $x_t$ is modeled as $$x_k = \begin{bmatrix} x \\ y \\ z \\ \dot{x} \\ \dot{y} \\ \dot{z} \end{bmatrix}_t$$

where x, y, z are the positions in 3 dimensions and $v_x=\dot{x}$, $v_y=\dot{y}$, $v_z=\dot{z}$ are the rate of change of positions in the respective 3 dimensions. The observations for the Extended Kalman filter are the erroneous range measurements denoted by the vector, $\tilde{d}_t=d_k+v_t$, where $d_t$ is the true range and $v_t$ is the measurement error vector. Other models for EKF including but not limited to the state modeled as $$x_k = \begin{bmatrix} x \\ y \\ z \end{bmatrix}_t,$$

positions and the velocity modeled by process noise are also possible. Other dynamics that model localization and tracking using range measurements are not precluded.

Figure 36:
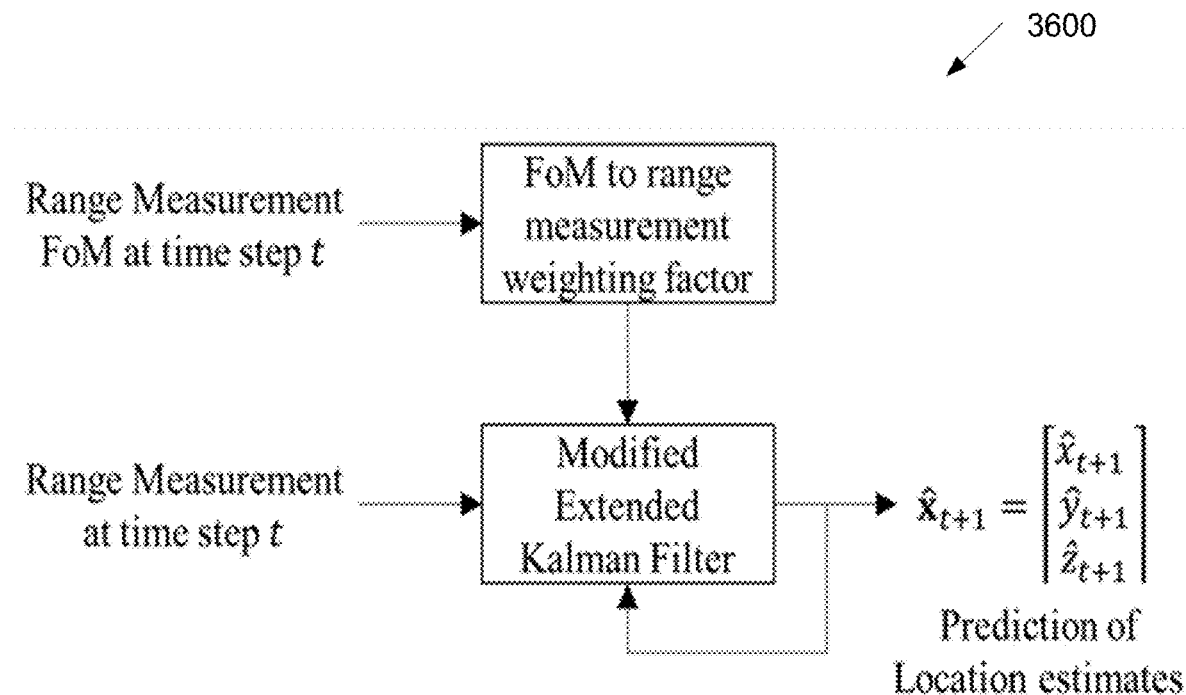
FIG. 36 illustrates an example diagrammatic representation of localization with modified extended Kalman filter according to embodiments of the present disclosure.

FIG. 36 illustrates an example diagrammatic representation of localization with modified extended Kalman filter 3600 according to embodiments of the present disclosure. The embodiment of the diagrammatic representation of localization with modified extended Kalman filter 3600 shown in FIG. 36 is for illustration only. One or more of the components illustrated in FIG. 36 can be implemented in specialized circuitry configured to perform the noted functions or one or more of the components can be implemented by one or more processors executing instructions to perform the noted functions.

FoM information is incorporated in the Kalman filter as shown in FIG. 36. While the scheme described is for extended Kalman filter, other realizations of Kalman filter with or without additional processing blocks in cascade including but not limited to non-linear least squares, incorporating confidence of range measurements localization and tracking are not precluded.

R is the measurement error covariance matrix. Typically, R is a diagonal matrix (unless errors between two sensors are correlated.

Let $\beta_t$ be a vector of weighting factor denoting an either an estimate or a function of the measurement error. If instantaneous error, $v_k$ is known at each measurement, then the weighting factor may be absolute or square of the instantaneous error. If a function $f(v_t)$ is known, then $\beta_k$ can accordingly represent the same.

A is is the state transition model of the extended Kalman filter for 3D or 2D localization, P is the prediction error covariance matrix, Q is the process noise covariance, H is the Jacobian matrix, $x_{a_j}$ is the 3D vector of anchor j location, and K is known as the Kalman gain.

Prediction: $\hat{x}_t = A\hat{x}_{t-1} + w_{t-1}$ and $P_t = AP_{t-1}A^T + Q$.

Update:

$$y_t = \tilde{d}_t - f(\hat{x}_t, x_a)$$

$$\bar{R}_t = \beta^T R_t$$

$$S_t = H_t P_t H_t^T + \bar{R}_t$$

$$K_t = P_t H_t^T S_t^{-1}$$

$$\hat{x}_t^+ = \hat{x}_t + K_t y_t$$

$$P_t^+ = (I - K_t H_t) P_t$$

The Jacobian is computed as $$H_t(j, i) = \frac{\partial f(\hat{x}_t^+, x_{a_j})}{\partial x_i}.$$

The function relating the range measurement and the anchor location for $j^{th}$ anchor is given by $d_j = \sqrt{(x-x_j)^2 + (y-y_j)^2 + (z-z_j)^2}$. The function, $f(\hat{x}_t^+, x_{a_j}) = d_j$.

The Jacobian is computed using the following equations, $$\frac{\partial f(\hat{x}_t^+, x_{a_j})}{\partial x} = \frac{x - x_j}{d_j}$$

$$\frac{\partial f(\hat{x}_t^+, x_{a_j})}{\partial y} = \frac{y - y_j}{d_j}$$

$$\frac{\partial f(\hat{x}_t^+, x_{a_j})}{\partial z} = \frac{z - z_j}{d_j}.$$

Figure 37:
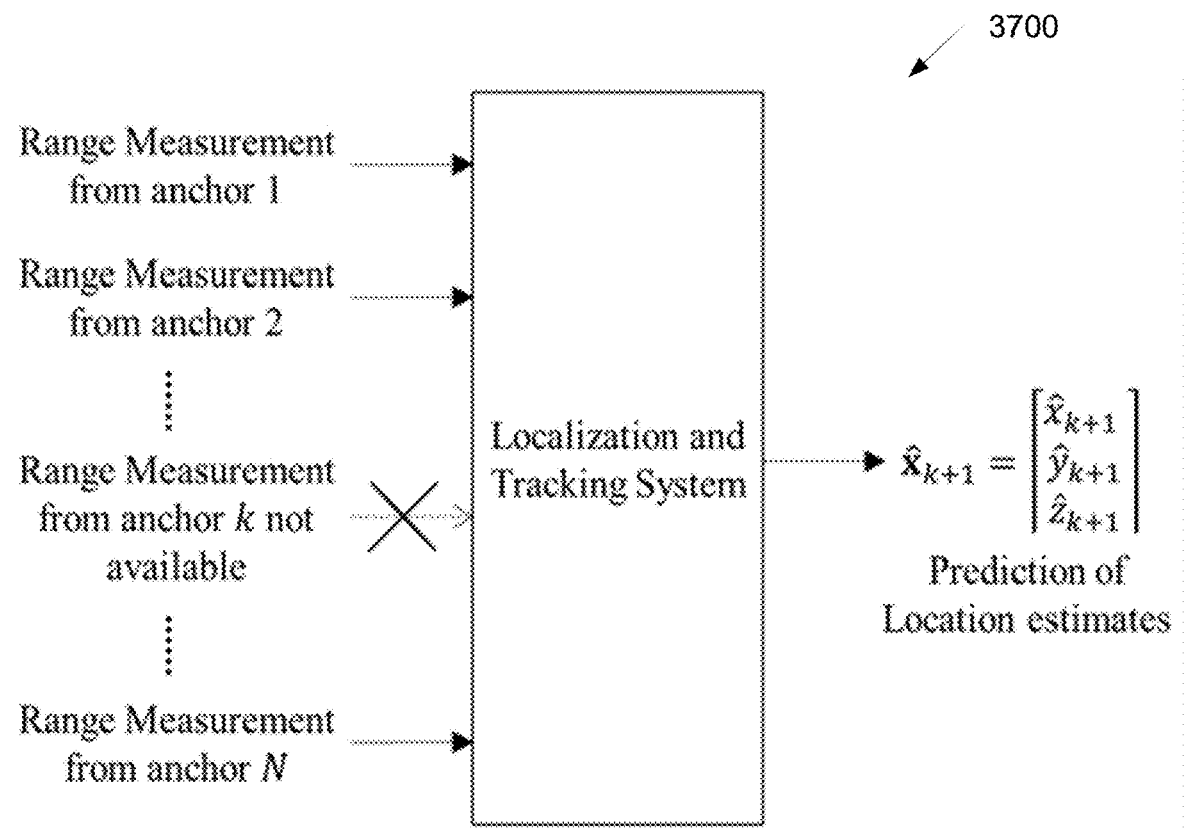
FIG. 37 illustrates an example range measurement with partial measurement loss for a localization and tracking system according to embodiments of the present disclosure.

Range measurements are erroneous and, in some cases, may not render any measurement for one or more ranges. Range measurements from one or more anchors may be discarded if the range measurements are unusable for any reason including but not limited to errors in measurements, loss of measurement data, no measurement available, etc., as shown in FIG. 37. Such cases are referred as partial measurement loss (other references to the same are not precluded).

FIG. 37 illustrates an example range measurement with partial measurement loss 3700 for a localization and tracking system according to embodiments of the present disclosure. The embodiment of the range measurement with partial measurement loss 3700 shown in FIG. 37 is for illustration only. One or more of the components illustrated in FIG. 37 can be implemented in specialized circuitry configured to perform the noted functions or one or more of the components can be implemented by one or more processors executing instructions to perform the noted functions.

The localization and tracking system are designed to be capable of handling such partial measurement losses. An example of such a localization system using extended Kalman filter is described in the mentioned embodiments (e.g., S6). While the scheme described is for extended Kalman filter, other realizations of Kalman filter with or without additional processing blocks in cascade including but not limited to non-linear least squares, employing partial measurement loss of range measurements localization and tracking are not precluded.

In one embodiment (S6), extended Kalman filter with partial measurement loss for localization and tracking is provided.

Figure 38:
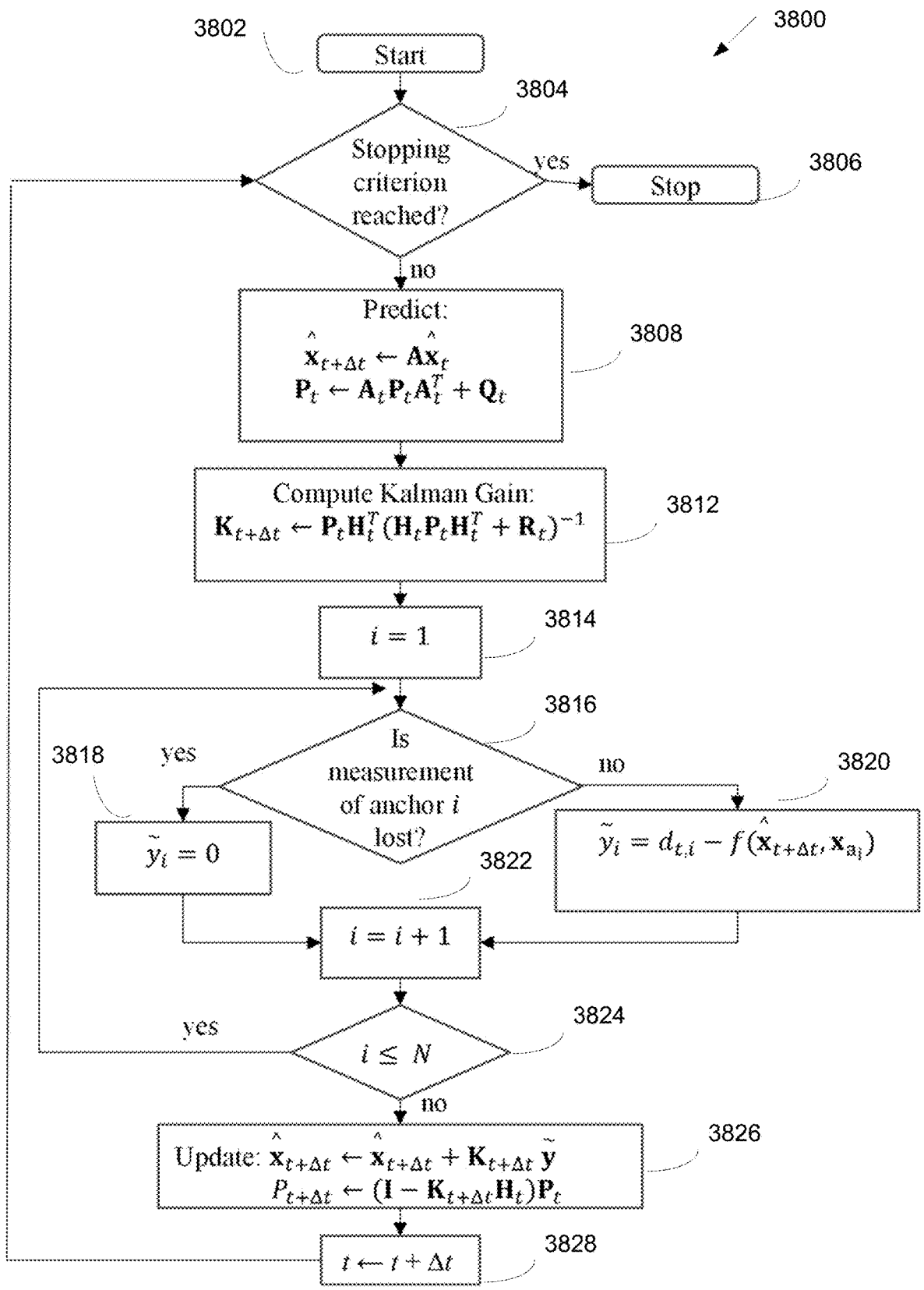
FIG. 38 illustrates a flow chart of a method for extended Kalman filter with partial measurement loss according to embodiments of the present disclosure.

The extended Kalman filter utilizes the current range measurement to compute the "innovation" or measurement pre-fit residual as $y_t = \tilde{d}_t - f(\hat{x}_t, x_a)$. If the measurements for a particular anchor is absent, the innovations are computed for the rest of the range measurements and the innovations for lossy measurements are replaced by zero for the current iteration step. This example procedure is illustrated in FIG. 38. Note that the notations $\hat{x}_{t+\Delta t}$ and $\hat{x}_t^+$ are used interchangeably.

FIG. 38 illustrates a flow chart of a method 3800 for extended Kalman filter with partial measurement loss according to embodiments of the present disclosure. The embodiment of the method 3800 shown in FIG. 38 is for illustration only. One or more of the components illustrated in FIG. 38 can be implemented in specialized circuitry configured to perform the noted functions or one or more of the components can be implemented by one or more processors executing instructions to perform the noted functions.

As illustrated in FIG. 38, the method 3800 begins at step 3802. In step 3804, the method determines whether stopping criterion is reached. In step 3804, if yes, the method 3800 stops in step 3806. In step 3804, if no, the method 3800 performs step 3808. In step 3808, the method 3800 performs a prediction. In step 3810, the method 3800 compute the Jacobian. In step 3812, the method 3800 compute Kalman gain. In step 3814, the method 3800 set "i=1". In step 3816, the method 3800 determines measurement of anchor i is lost. In step 3816, if no, the method 3800 performs step 3820. In step 3816, if yes, the method 3800 perform step 3818. In step 3822, the method set "i=i+1." In step 3824, the method 3800 determines N is greater than or equal to i. In step 3824, if yes, the method 3800 performs step 3816. In step 3824, if no, the method 3800 performs step 3826. The method 3800 performs step 3828 and move to step 3804.

Incorporation of angle of arrival and range measurements for localization and tracking system improves the accuracy. Both range measurements and angle of arrival may suffer from partial measurement loss. Angle of arrival information may be considered as usable only in the case of LOS and considered unusable if the channel between the anchor and the tag are NLOS, though other cases are not precluded. Range measurements from one or more anchors may be discarded if the range measurements are unusable for any reason including but not limited to errors in measurements, loss of measurement data, no measurement available, etc. While the scheme described is for extended Kalman filter, other realizations of Kalman filter with or without additional processing blocks in cascade including but not limited to non-linear least squares, employing partial measurement loss of range measurements and AoA for localization and tracking are not precluded.

In one embodiment (S7), extended Kalman filter for localization and tracking with partial measurement loss of range measurements and angle of arrival (AoA) is provided.

The AoA is incorporated in the extended Kalman Filter in the state equations with the AoA and rate of change of AoA. An example of AoA for the Z-dimension is described in this scheme, although considering AoA for other dimensions is not precluded. The function mapping the Z-co-ordinate and the elevation angle of arrival is given by $$g(\hat{x}_{t+\Delta t}, x_{a_j}) = \arcsin\left(\frac{z - z_j}{r_j}\right).$$

The corresponding Jacobian is computed using:

$$\frac{\partial g(\hat{x}_{t+\Delta t}, x_{a_j})}{\partial x} = -\frac{x - x_j}{\sqrt{d_j^2 - (z - z_j)^2}}$$

$$\frac{\partial g(\hat{x}_{t+\Delta t}, x_{a_j})}{\partial y} = -\frac{y - y_j}{\sqrt{d_j^2 - (z - z_j)^2}}$$

$$\frac{\partial g(\hat{x}_{t+\Delta t}, x_{a_j})}{\partial x} = -\frac{1}{\sqrt{d_j^2 - (z - z_j)^2}}\left(1 - \frac{(z - z_j)^2}{d_j^2}\right)$$

Figure 39:
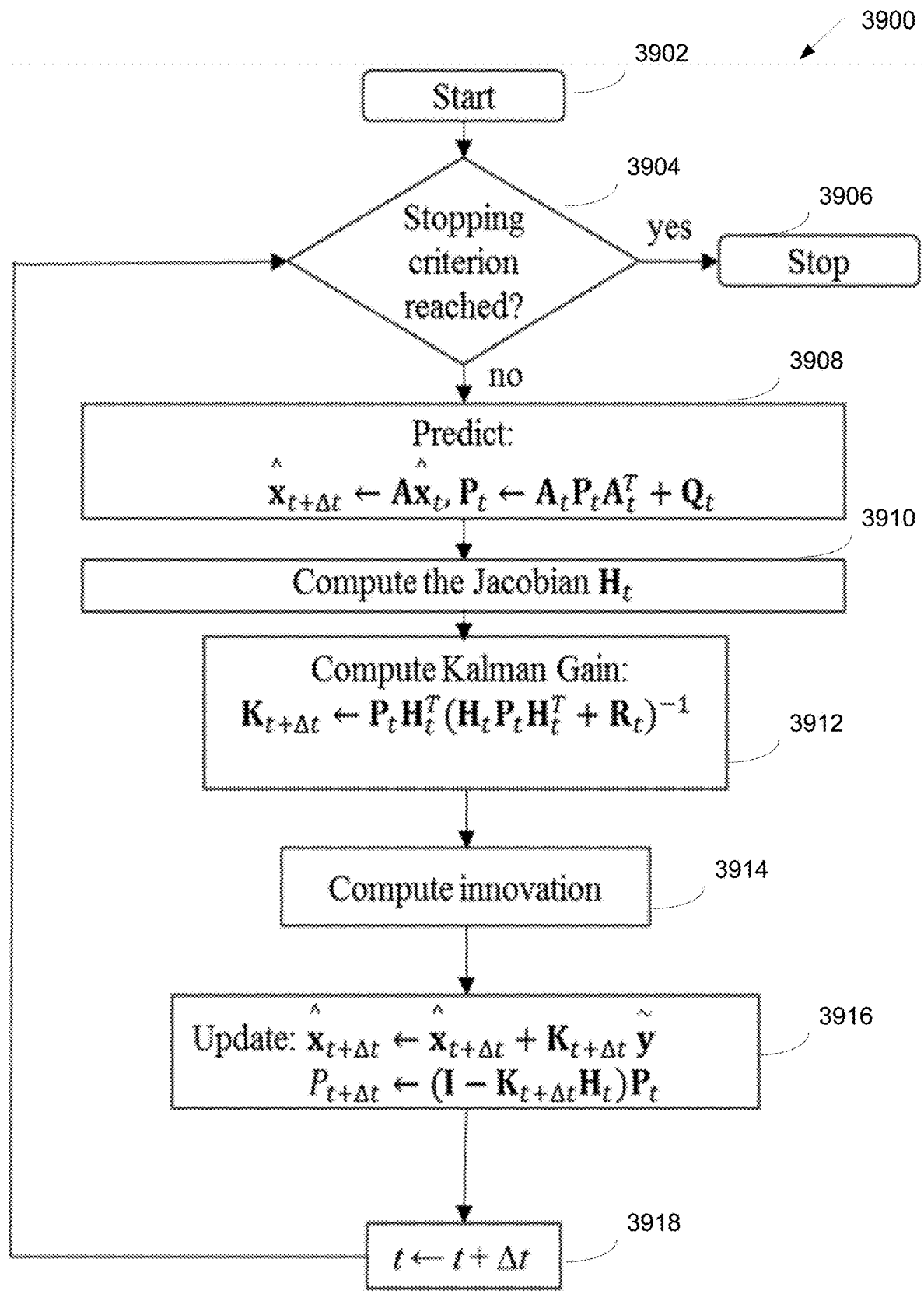
FIG. 39 illustrates a flow chart of a method for extended Kalman filter steps (with range measurements and AoA) according to embodiments of the present disclosure.
Figure 40:
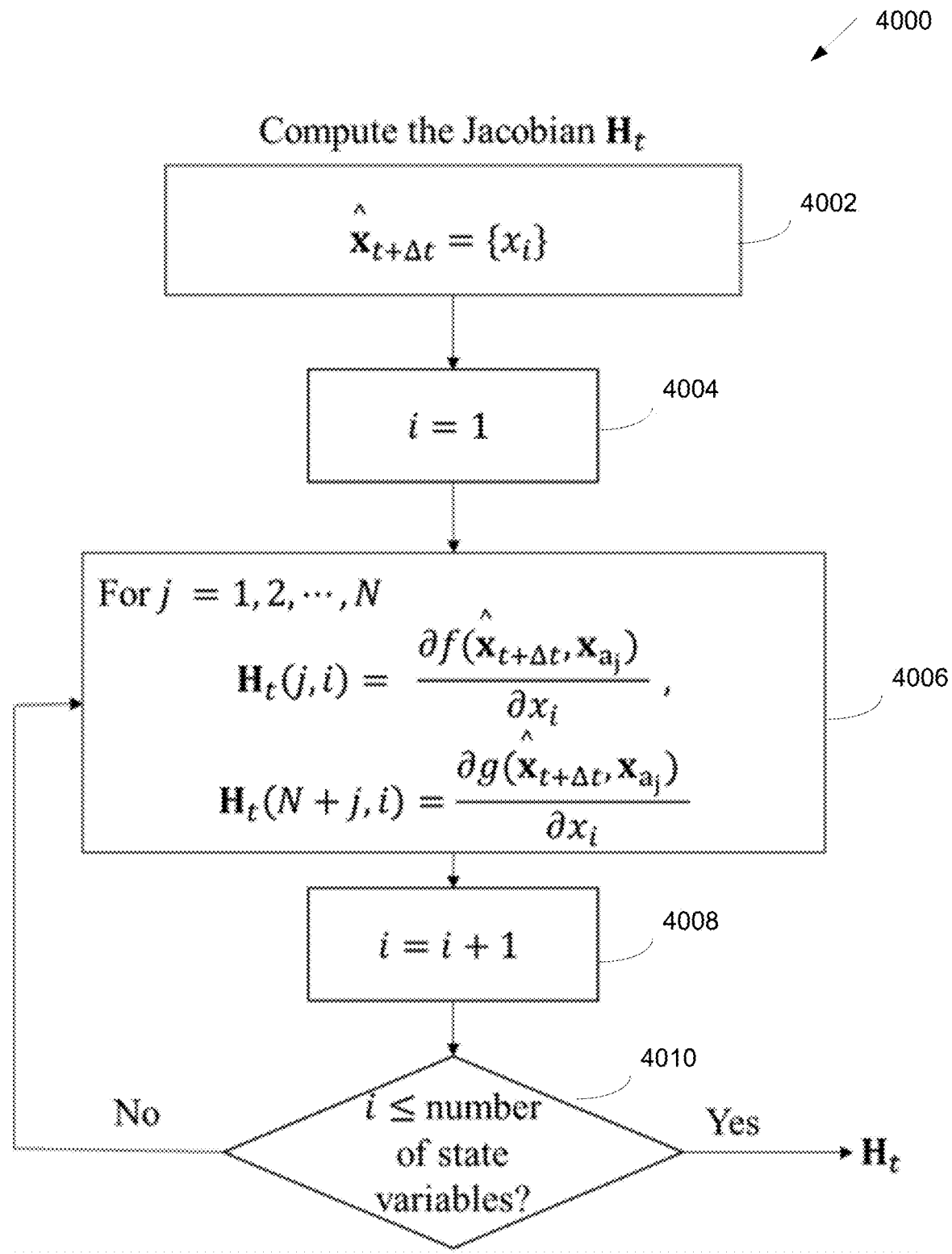
FIG. 40 illustrates a flow chart of a method for computing Jacobian considering range measurements and AoA for localization with extended Kalman filter according to embodiments of the present disclosure.

The illustration of the flowchart of Extended Kalman Filter with incorporation of AoA is shown in FIG. 39 with the example computation of the Jacobian as illustrated in FIG. 40.

FIG. 39 illustrates a flow chart of a method 3900 for extended Kalman filter steps (with range measurements and AoA) according to embodiments of the present disclosure. The embodiment of the method 3900 shown in FIG. 39 is for illustration only. One or more of the components illustrated in FIG. 39 can be implemented in specialized circuitry configured to perform the noted functions or one or more of the components can be implemented by one or more processors executing instructions to perform the noted functions.

As illustrated in FIG. 39, the method 3900 begins at step 3902. In step 3904, the method determines whether stopping criterion is reached. In step 3904, if yes, the method 3900 stops in step 3906. In step 3904, if no, the method 3900 performs step 3908. In step 3908, the method 3900 performs a prediction. In step 3910, the method 3900 compute the Jacobian $H_r$. In step 3912, the method 3900 compute Kalman gain. In step 3914, the method 3900 computes innovation. In step 3916, the method 3900 performs updating. In step 3818, the method 3900 updates the timing value, and then performs step 3904.

FIG. 40 illustrates a flow chart of a method 4000 for compute for Jacobian considering range measurements and AoA for localization with extended Kalman filter according to embodiments of the present disclosure. The embodiment of the method 4000 shown in FIG. 40 is for illustration only. One or more of the components illustrated in FIG. 40 can be implemented in specialized circuitry configured to perform the noted functions or one or more of the components can be implemented by one or more processors executing instructions to perform the noted functions.

As illustrated in FIG. 40, the method 4000 computes Jacobian $H_t$ in step 4002. In step 4004, the method 4000 set "i=1." The method 4000 perform computation in step 4006 and set "i=i+1" in step 4008. In step 4010, the method determines in step 4010 a number of state variable is greater than or equal to i. In step 4010, if yes, the method 4000 generates $H_t$. In step 4010, if no, the method 4000 performs step 4006.

The partial loss of measurement for range and AoA is incorporated while computing the innovation for the Extended Kalman Filter. Innovations for anchors with lossy measurements for both range and AoA are replaced with zero, while innovations for other terms are computed and fed into the steps of the extended Kalman filter as shown in FIG. 41.

Figure 41:
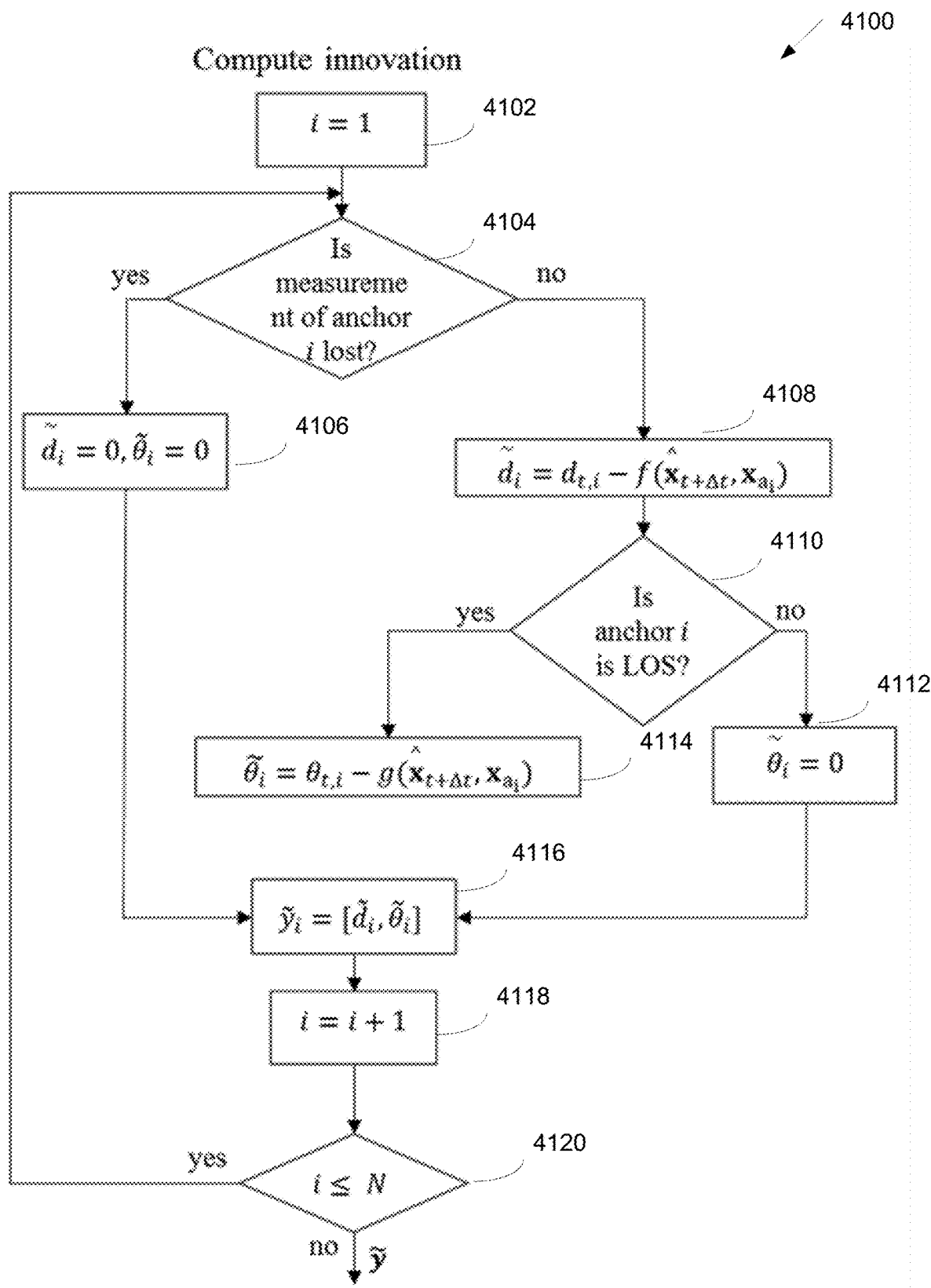
FIG. 41 illustrates a flow chart of a method for computing innovations considering partial measurement loss in range measurements and AoA for localization with extended Kalman filter according to embodiments of the present disclosure.

FIG. 41 illustrates a flow chart of a method 4100 for computing innovations considering partial measurement loss in range measurements and AoA for localization with extended Kalman Filter according to embodiments of the present disclosure. The embodiment of the method 4100 shown in FIG. 41 is for illustration only. One or more of the components illustrated in FIG. 41 can be implemented in specialized circuitry configured to perform the noted functions or one or more of the components can be implemented by one or more processors executing instructions to perform the noted functions.

As illustrated in FIG. 41, the method 4100 begins at step 4102. In step 4102, the method 4100 determines "i=1." In step 4102, the method 400 determines whether measurement of anchor i is lost. In step 4104, if yes, the method 4100 performs step 4106. And then the method 4100 performs steps 4116 and 4118. In step 4104, if no, the method 4100 performs step 4108. In step 4110, the method 4100 determines anchor i is LOS. In step 4110, if no, the method 4100 performs step 4112. In step 4110, if yes, the method 4100 performs step 4114. In step 4120, the method 4100 determines N is greater than or equal to i. In step 4120, if no, the method 4100 generates ỹ. In step 4120, if yes, the method 4100 performs step 4104.

The innovations for range measurements $\tilde{d}_i$ and AoA $\tilde{\theta}_i$ for anchor i at time step t are individually computed based on the partial measurement loss. Even if range measurement from a particular anchor is available, the AoA measurement may be unusable if the anchor is not LOS. Other reasons for partial measurement loss of AoA are not precluded.

Figure 42:
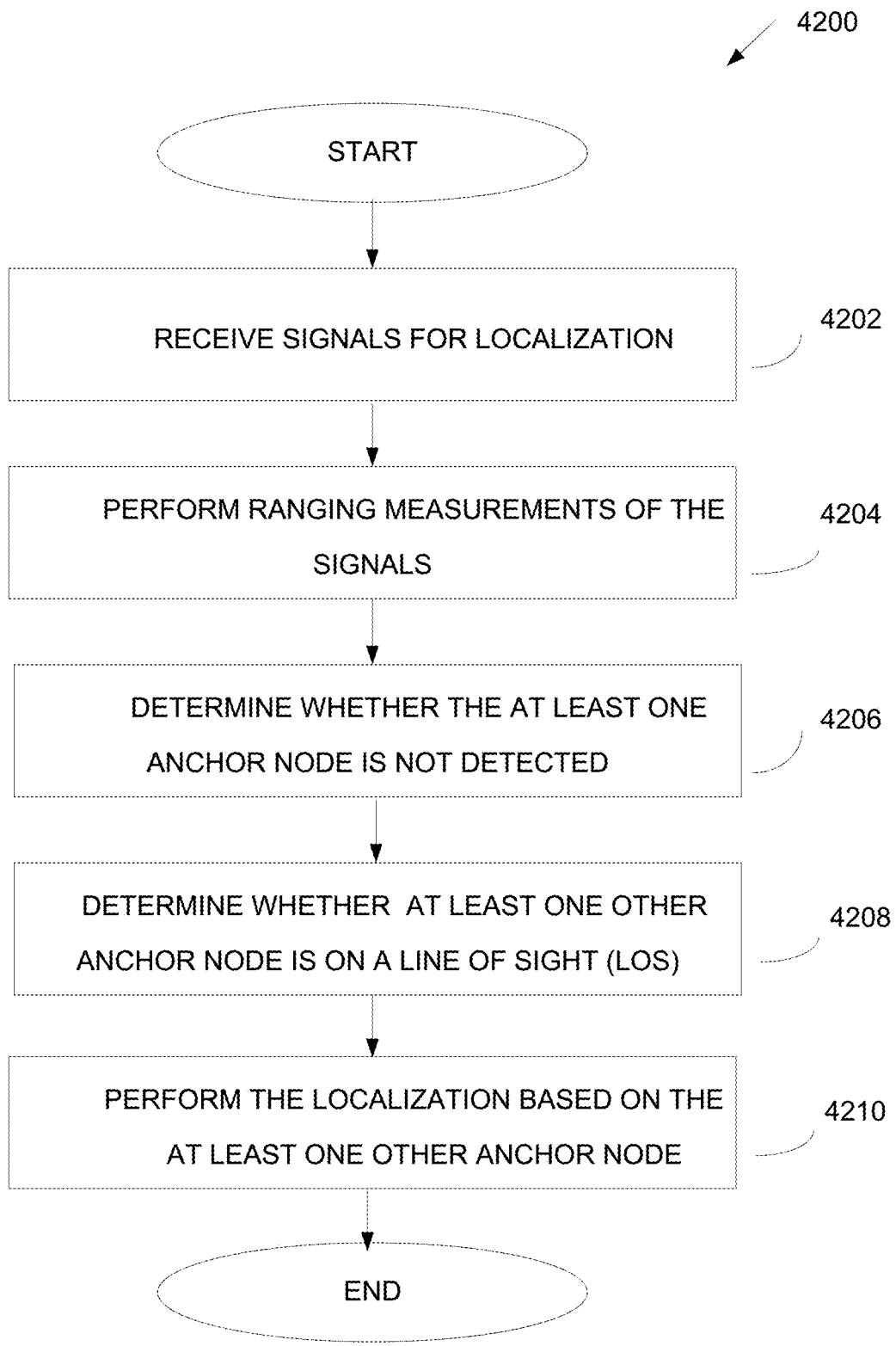
FIG. 42 illustrates a flowchart of a method for cell-based localization according to embodiments of the present disclosure.

FIG. 42 illustrates a flowchart of a method 4200 for cell-based localization according to embodiments of the present disclosure, as may be performed by a UE (e.g., 111-116 as illustrated in FIG. 1). The embodiment of the method 4200 shown in FIG. 42 is for illustration only. One or more of the components illustrated in FIG. 42 can be implemented in specialized circuitry configured to perform the noted functions or one or more of the components can be implemented by one or more processors executing instructions to perform the noted functions.

As illustrated in FIG. 42, the method 4200 begins at step 4202. In step 4202, a UE receives, from a plurality of anchor nodes, signals for the localization.

Subsequently, the UE in step 4204 performs ranging measurements of the signals based on a range and an angle of arrival (AoA) of the signals.

Subsequently, the UE in step 4204 determines whether at least one of the plurality of anchor nodes is not detected based on the ranging measurements.

Next, the UE in step 4206 determines, based on a determination that the at least one anchor node is not detected based on the ranging measurements, whether the at least one other anchor node in the plurality of anchor nodes is located on a line of sight (LOS) from the electronic device, wherein the LOS is determined based on the AoA of the signals.

Finally, the UE in step 4208 performs the localization based on the at least one other anchor node.

In one embodiment, the UE discards results of the ranging measurements of the signals if the results of the ranging measurements do not meet a condition that is determined based on a position of a tag within a localization region.

In one embodiment, the UE identifies, based on the ranging measurements of the signals, a set of extended Kalman filters (EKFs) each of which includes a different dynamic order and generates a first state estimate at a second time instance of corresponding EKF in the set of EKFs based on the ranging measurements and a first state estimate at a first time, wherein the first state estimate at the first time instance is an input estimate value to generate the first state estimate at the second time instance.

In one embodiment, the UE calculates probability of the first state estimate at the second time instance of corresponding EKF in the set of EKFs based on a Markov chain comprising transit probabilities among the set of EKFs, updates, using the calculated probability, a model selection probability to select one of the set of EKFs, and mix the updated model selection probability with the first state estimate at the first time instance to generate the first state estimate at the second time instance.

In one embodiment, the UE combines, based on the updated model selection probability, a set of the first state estimate at the second time instance of corresponding EKF in the set of EKFs and generates a mixed state estimate based on the combined set of first state estimate at the second time instance of corresponding EKF in the set of EKFs.

In one embodiment, the UE selects one or more anchor nodes from the at least one anchor node based on a location and an accuracy threshold, performs the ranging measurements from the signal received from the selected one or more anchor nodes, and performs the localization based on the ranging measurements.

In one embodiment, the UE identifies the accuracy threshold based on a pre-determined estimate accuracy threshold, wherein the accuracy threshold is based on an accuracy metric including functions of a plurality of anchor nodes.

In one embodiment, the UE obtains a position of an anchor node in the at least one anchor node in a global coordinate system (GCS), identifies a maximum geometric dilution of precision (GDOP) threshold and a localization mode comprising one-dimension, two-dimension, and three-dimension localization modes, reduces, based on the identified GDOP threshold and the identified localization mode, a number of anchor nodes from the at least one anchor node, and identifies indices of the reduced number of anchor nodes and a range of the localization mode in which the reduced number of anchor nodes operates.

In one embodiment, the UE identifies a spatial region associated with the at least one anchor node or a set of anchor nodes for a cell-based localization and generates, based on the spatial region associated with the at least one anchor node or a set of anchor nodes, a state graph comprising a set of connectivity graphs that is configured based on tessellated spatial regions.

In one embodiment, the UE performs the ranging measurements of the signals from the at least one anchor node, updates state probabilities based on a dynamic mode or likelihood values that are computed from the ranging measurements, and generates, based on the likelihood values, confidence values indicating a probability of a location of a target anchor node among the at least one anchor node in a cell.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. An electronic device for performing localization in a wireless communication system, the electronic device comprising:
   a transceiver configured to receive, from a plurality of anchor nodes, signals for the localization; and
   a processor operably connected to the transceiver, the processor configured to:
      perform ranging measurements of the signals based on a range and an angle of arrival (AoA) of the signals;
      determine whether at least one of the plurality of anchor nodes is not detected based on the ranging measurements;
      determine, based on a determination that the at least one anchor node is not detected based on the ranging measurements, whether at least one other anchor node in the plurality of anchor nodes is located on a line of sight (LOS) from the electronic device, wherein the LOS is determined based on the AoA of the signals; and
      perform the localization based on the at least one other anchor node.

2. The electronic device of claim 1, wherein the processor is further configured to discard results of the ranging measurements of the signals if the results of the ranging measurements do not meet a condition that is determined based on a position of a tag within a localization region.

3. The electronic device of claim 1, wherein:
the processor is further configured to:
identify, based on the ranging measurements of the signals, a set of extended Kalman filters (EKFs) each of which includes a different dynamic order, and
generate a second state estimate of a corresponding EKF in the set of EKFs based on the ranging measurements and a first state estimate; and
the first state estimate at a first time instance is an input estimate value to generate the first state estimate at a second time instance.

4. The electronic device of claim 3, wherein the processor is further configured to:
calculate a probability of the second state estimate of corresponding EKF in the set of EKFs based on a Markov chain comprising transit probabilities among the set of EKFs; and
update, using the calculated probability, a model selection probability to select one of the set of EKFs.

5. The electronic device of claim 4, wherein the processor is further configured to:
combine, based on the updated model selection probability, a set of the second state estimate of corresponding EKF in the set of EKFs; and
generate a mixed state estimate based on the combined set of second state estimate of corresponding EKF in the set of EKFs.

6. The electronic device of claim 1, wherein the processor is further configured to:
select one or more anchor nodes from the plurality of anchor nodes based on a location and an accuracy threshold;
perform the ranging measurements from the signal received from the selected one or more anchor nodes; and
perform the localization based on the ranging measurements.

7. The electronic device of claim 6, wherein:
the processor is further configured to identify the accuracy threshold based on a pre-determined estimate accuracy threshold; and
the accuracy threshold is based on an accuracy metric including functions of the plurality of anchor nodes.

8. The electronic device of claim 6, wherein the processor is further configured to:
obtain a position of an anchor node in the plurality of anchor nodes in a global coordinate system (GCS);
identify a maximum geometric dilution of precision (GDOP) threshold and a localization mode comprising one-dimension, two-dimension, and three-dimension localization modes;
reduce, based on the identified GDOP threshold and the identified localization mode, a number of anchor nodes from the plurality of anchor nodes; and
identify indices of the reduced number of anchor nodes and a range of the localization mode in which the reduced number of anchor nodes operates.

9. The electronic device of claim 1, wherein the processor is further configured to:
identify a spatial region associated with the at least one other anchor node or a set of anchor nodes for a cell-based localization; and
generate, based on the spatial region associated with the at least one other anchor node or the set of anchor nodes, a state graph comprising a set of connectivity graphs that is configured based on tessellated spatial regions.

10. The electronic device of claim 9, wherein the processor is further configured to:
perform the ranging measurements of the signals from the at least one other anchor node;
update state probabilities based on a dynamic mode or likelihood values that are computed from the ranging measurements; and
generate, based on the likelihood values, confidence values indicating a probability of a location of a target anchor node among the plurality of anchor nodes in a cell.

11. A method of an electronic device for performing localization in a wireless communication system, the method comprising:
receiving, from a plurality of anchor nodes, signals for the localization;
performing ranging measurements of the signals based on a range and an angle of arrival (AoA) of the signals;
determining whether at least one of the plurality of anchor nodes is not detected based on the ranging measurements;
determining, based on a determination that the at least one anchor node is not detected based on the ranging measurements, whether at least one other anchor node in the plurality of anchor nodes is located on a line of sight (LOS) from the electronic device, wherein the LOS is determined based on the AoA of the signals; and
performing the localization based on the at least one other anchor node.

12. The method of claim 11, further comprising discarding results of the ranging measurements of the signals if the results of the ranging measurements do not meet a condition that is determined based on a position of a tag within a localization region.

13. The method of claim 11, further comprising:
identifying, based on the ranging measurements of the signals, a set of extended Kalman filters (EKFs) each of which includes a different dynamic order; and
generating a second state estimate of a corresponding EKF in the set of EKFs based on the ranging measurements and a first state estimate, wherein the first state estimate at a first time instance is an input estimate value to generate the first state estimate at a second time instance.

14. The method of claim 13, further comprising:
calculating a probability of the second state estimate of corresponding EKF in the set of EKFs based on a Markov chain comprising transit probabilities among the set of EKFs; and
updating, using the calculated probability, a model selection probability to select one of the set of EKFs.

15. The method of claim 14, further comprising:
combining, based on the updated model selection probability, a set of the second state estimate of corresponding EKF in the set of EKFs; and
generating a mixed state estimate based on the combined set of second state estimate of corresponding EKF in the set of EKFs.

16. The method of claim 11, further comprising:
selecting one or more anchor nodes from the plurality of anchor nodes based on a location and an accuracy threshold;

performing the ranging measurements from the signal received from the selected one or more anchor nodes; and performing the localization based on the ranging measurements.

17. The method of claim 16, further comprising identifying the accuracy threshold based on a pre-determined estimate accuracy threshold, wherein the accuracy threshold is based on an accuracy metric including functions of the plurality of anchor nodes.

18. The method of claim 16, further comprising:

obtaining a position of an anchor node in the plurality of anchor nodes in a global coordinate system (GCS);

identifying a maximum geometric dilution of precision (GDOP) threshold and a localization mode comprising one-dimension, two-dimension, and three-dimension localization modes;

reducing, based on the identified GDOP threshold and the identified localization mode, a number of anchor nodes from the plurality of anchor nodes; and identifying indices of the reduced number of anchor nodes and a range of the localization mode in which the reduced number of anchor nodes operates.

19. The method of claim 11, further comprising:

identifying a spatial region associated with the at least one other anchor node or a set of anchor nodes for a cell-based localization; and generating, based on the spatial region associated with the at least one other anchor node or the set of anchor nodes, a state graph comprising a set of connectivity graphs that is configured based on tessellated spatial regions.

20. The method of claim 19, further comprising:

performing the ranging measurements of the signals from the at least one other anchor node;

updating state probabilities based on a dynamic mode or likelihood values that are computed from the ranging measurements; and generating, based on the likelihood values, confidence values indicating a probability of a location of a target anchor node among the plurality of anchor nodes in a cell.

* * * * *